(12) United States Patent
O et al.

(10) Patent No.: US 11,831,169 B2
(45) Date of Patent: Nov. 28, 2023

(54) WIRELESS POWER TRANSMISSION DEVICE AND OPERATING METHOD THEREFOR

(71) Applicant: SAMSUNG ELECTRONICS CO., LTD., Suwon-si (KR)

(72) Inventors: Changhak O, Suwon-si (KR); Hyungkoo Chung, Suwon-si (KR); Mincheol Ha, Suwon-si (KR); Yongsang Yun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 284 days.

(21) Appl. No.: 17/430,907

(22) PCT Filed: Feb. 13, 2020

(86) PCT No.: PCT/KR2020/002026
§ 371 (c)(1),
(2) Date: Aug. 13, 2021

(87) PCT Pub. No.: WO2020/171476
PCT Pub. Date: Aug. 27, 2020

(65) Prior Publication Data
US 2022/0149658 A1  May 12, 2022

(30) Foreign Application Priority Data
Feb. 19, 2019  (KR) .......................... 10-2019-0019572

(51) Int. Cl.
*H02J 50/10* (2016.01)
*H02J 50/80* (2016.01)
*H02J 7/00* (2006.01)

(52) U.S. Cl.
CPC .......... *H02J 50/10* (2016.02); *H02J 7/00712* (2020.01); *H02J 50/80* (2016.02)

(58) Field of Classification Search
CPC ......... H02J 50/10; H02J 50/80; H02J 7/00712
(Continued)

(56) References Cited

U.S. PATENT DOCUMENTS

| 9,893,556 B2 | 2/2018 | Iwasaki et al. |
| 10,938,243 B2 | 3/2021 | Kim et al. |

(Continued)

FOREIGN PATENT DOCUMENTS

| KR | 10-2017-0061787 | 6/2017 |
| KR | 10-2018-0009175 | 1/2018 |

(Continued)

OTHER PUBLICATIONS

International Search Report for PCT/KR2020/002026 dated Jun. 12, 2020, 5 pages.
(Continued)

*Primary Examiner* — Alfonso Perez Borroto
(74) *Attorney, Agent, or Firm* — Nixon & Vanderhye, P.C.

(57) ABSTRACT

Disclosed is a power transmission device for wirelessly supplying power to an external electronic device, the power transmission device comprising: a coil configured to transmit a wireless signal to the electronic device based on a transmission power; a power generation circuit configured to supply, to the coil, the transmission power generated based on an input voltage; and a control circuit electrically connected to the coil and the power generation circuit, wherein the control circuit is configured: to receive information about charging power from the electronic device; to determine whether a voltage drop event related to a drop of the internal voltage of the electronic device has occurred, based on the difference between the transmission power and the charging power; and to regulate the level of the input voltage based on results obtained from the determination.

20 Claims, 15 Drawing Sheets

(58) Field of Classification Search
USPC .......................................................... 307/104
See application file for complete search history.

(56) References Cited

U.S. PATENT DOCUMENTS

| | | | |
|---|---|---|---|
| 2013/0200719 A1 | 8/2013 | Ishihara et al. | |
| 2017/0093217 A1* | 3/2017 | Cho | H02J 50/12 |
| 2018/0062443 A1* | 3/2018 | Cho | H02J 50/10 |
| 2018/0102669 A1* | 4/2018 | Son | H04B 5/0037 |
| 2018/0152051 A1* | 5/2018 | Kim | H02M 3/155 |
| 2019/0157910 A1 | 5/2019 | Choi et al. | |
| 2020/0287419 A1 | 9/2020 | Sherman et al. | |

FOREIGN PATENT DOCUMENTS

| | | |
|---|---|---|
| KR | 10-2018-0025762 | 3/2018 |
| KR | 10-2018-0073535 | 7/2018 |
| WO | 2018/163177 | 9/2018 |

OTHER PUBLICATIONS

Written Opinion of the ISA for PCT/KR2020/002026 dated Jun. 12, 2020, 6 pages.

* cited by examiner

WIRELESS POWER TRANSMISSION DEVICE AND OPERATING METHOD THEREFOR

CROSS-REFERENCE TO RELATED APPLICATIONS

This application is a national stage of International Application No. PCT/KR2020/002026 designating the United States, filed on Feb. 13, 2020, in the Korean Intellectual Property Receiving Office and claiming priority to Korean Patent Application No. 10-2019-0019572, filed on Feb. 19, 2019, in the Korean Intellectual Property Office, the disclosures of which are incorporated by reference herein in their entireties.

BACKGROUND

Field

The disclosure relates to a wireless charging technology.

Description of Related Art

A mobile electronic device such as a smartphone or a tablet PC may include a battery therein. The battery may be charged through a wired connector connected to the electronic device. Recently, technologies of wirelessly supplying power from a power transmission device to the electronic device, without a connection of the wired connector have been used.

A power reception device (e.g., an electronic device such as a smartphone) according to an existing technology receives power through a power transmission device (e.g., a wireless charging pad) and operates in a manner which charges an internal battery through a receive coil, a rectifier circuit, and the like. At this time, when a rectified voltage or a regulated voltage of the power reception device drops due to a voltage drop event (e.g., heating control), the power reception device does not notify the power transmission device that the voltage drop event occurs. Thus, although a charging voltage of the power reception device decreases, as the input voltage of the power transmission device is maintained without change, wireless charging efficiency between the power transmission device and the power reception device may decrease.

SUMMARY

Embodiments of the disclosure provide a power transmission device for determining occurrence of a voltage drop event of a power reception device based on information about a charging power received from the power reception device and decreasing an input voltage based on the determined result.

Embodiments of the disclosure provide a power transmission device for determining occurrence of a voltage drop event of a power reception device based on a change in frequency or duty ratio of a wireless power signal and decreasing an input voltage based on the determined result.

Embodiments of the disclosure provide a power transmission device for determining occurrence of a voltage drop event of a power reception device based on a change in current and voltage applied to a coil and decreasing an input voltage based on the determined result.

In accordance with an example embodiment of the disclosure, a power transmission device configured to wirelessly supply power to an external electronic device is provided. The power transmission device may include: a coil configured to transmit a radio signal to the external electronic device based on a transmit power, a power generation circuit configured to supply the transmit power generated based on an input voltage to the coil, and a control circuit electrically connected with the coil and the power generation circuit. The control circuit may be configured to: receive information about a charging power from the external electronic device, determine whether a voltage drop event associated with decreasing an internal voltage of the external electronic device occurs based on a difference between the transmit power and the charging power, and control a magnitude of the input voltage based on the determined result.

In accordance with an example embodiment of the disclosure, a power transmission device configured to wirelessly supply power to an external electronic device is provided. The power transmission device may include: a coil configured to transmit a radio signal to the external electronic device based on a transmit power, a power generation circuit configured to supply the transmit power generated based on an input voltage to the coil, and a control circuit electrically connected with the coil and the power generation circuit. The control circuit may be configured to: determine whether a voltage drop event associated with decreasing an internal voltage of the external electronic device occurs based on a transmit power frequency determined by the transmit power and control a magnitude of the input voltage based on the determined result.

In accordance with an example embodiment of the disclosure, a power transmission device configured to wirelessly supply power to an external electronic device is provided. The power transmission device may include: a coil configured to transmit a radio signal to the external electronic device based on a transmit power, a power generation circuit configured to supply the transmit power generated based on an input voltage to the coil, and a control circuit electrically connected with the coil and the power generation circuit. The control circuit may be configured to: determine whether a voltage drop event associated with decreasing an internal voltage of the external electronic device occurs based on a transmit power duty ratio determined by the transmit power and control a magnitude of the input voltage based on the determined result.

According to various example embodiments disclosed in the disclosure, the power transmission device may determine whether a voltage drop event of the power reception device occurs and may reduce the input voltage with regard to a decrease in charging voltage of the power reception device, thus improving wireless charging efficiency.

In addition, various effects ascertained directly or indirectly through the disclosure may be provided.

BRIEF DESCRIPTION OF THE DRAWINGS

The above and other aspects, features and advantages of certain embodiments of the present disclosure will be more apparent from the following detailed description, taken in conjunction with the accompanying drawings, in which.

With regard to description of drawings, the same or similar denotations may be used for the same or similar components.

DETAILED DESCRIPTION

Hereinafter, various example embodiments of the disclosure may be described with reference to accompanying drawings. However, it should be understood that this is not intended to limit the present disclosure to specific implementation forms and includes various modifications, equivalents, and/or alternatives of embodiments of the present disclosure.

Figure 1:
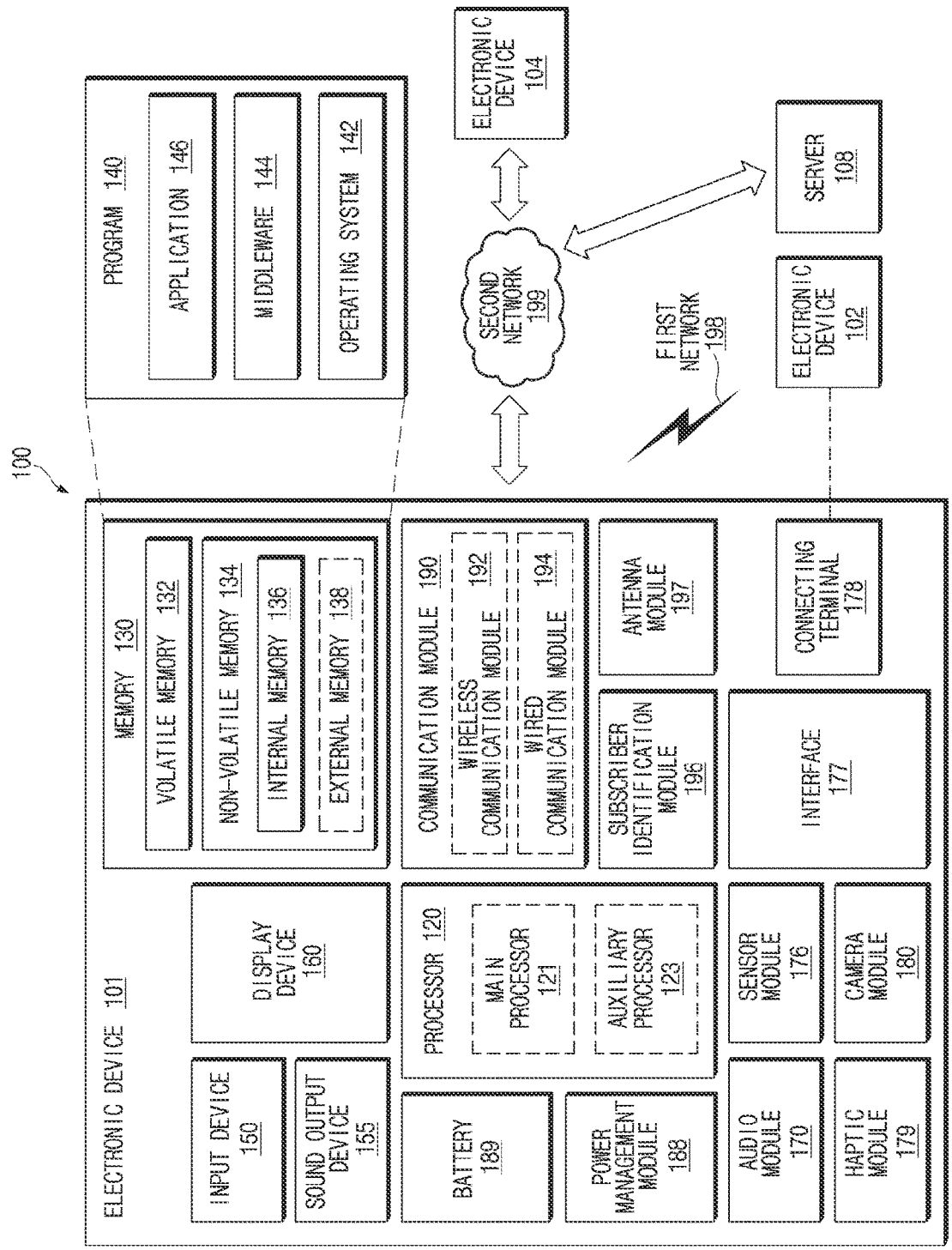
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
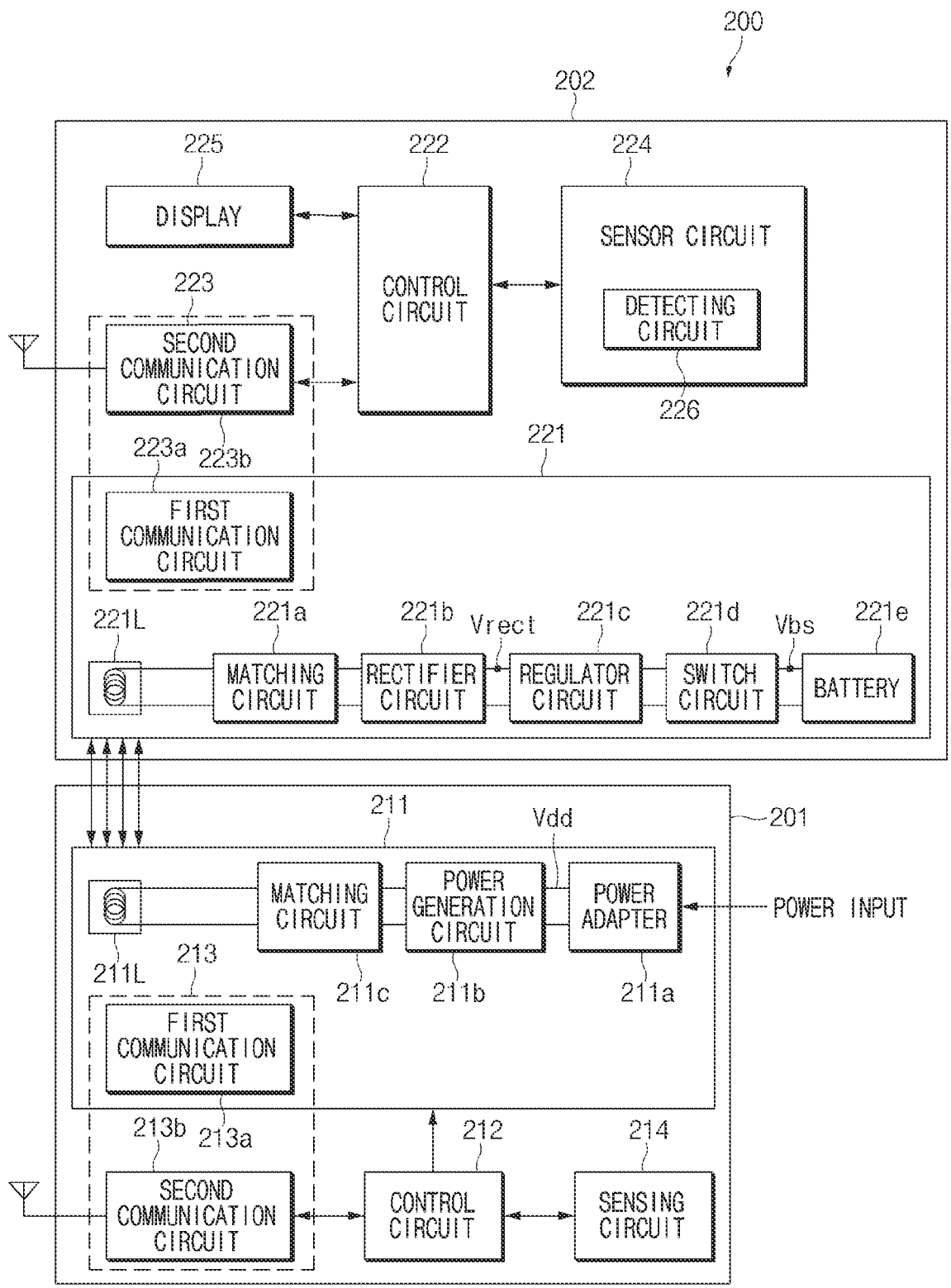
FIG. 2 is a block diagram illustrating an example wireless charging environment according to various embodiments.

FIG. 2 is a block diagram illustrating an example wireless charging environment 200 according to various embodiments.

Referring to FIG. 2, a power transmission device 201 (e.g., an electronic device 102 of FIG. 1 or a wireless charging pad) may wirelessly supply power to a power reception device 202 (e.g., an electronic device 101 of FIG. 1 or a smartphone), and the power reception device 202 may wirelessly receive power. The power transmission device 201 may be an electronic device which operates in a power transmission mode.

According to an embodiment, the power transmission device 201 may include a power transmission circuit 211, a control circuit 212, a communication circuit 213, or a sensing circuit 214.

According to an embodiment, the power transmission circuit 211 may include a power adapter 211a for receiving a power source (or power) from the outside and suitably converting a voltage of input power, a power generation circuit 211b for generating power, or a matching circuit 211c for maximizing efficiency between a transmit coil 211L and a receive coil 221L.

According to an embodiment, the power transmission circuit 211 may include at least some of the power adapter 211a, the power generation circuit 211b, the transmit coil 211L, or the matching circuit 211c to be plural in number to facilitate power transmission to a plurality of power reception devices (e.g., a first external electronic device and a second external electronic device).

According to an embodiment, the control circuit 212 may perform the overall control of the power transmission device 201 and may generate and deliver various messages necessary for wireless power transmission to the communication circuit 213. According to an embodiment, the control circuit 212 may calculate power (or the amount of power) to be transmitted to the power reception device 202 based on information received from the communication circuit 213. According to an embodiment, the control circuit 212 may control the power transmission circuit 211 such that power generated by the transmit coil 211L is transmitted to the power reception device 202.

According to an embodiment, the communication circuit 213 may include at least one of a first communication circuit 213a or a second communication circuit 213b. The first communication circuit 213a may communicate with a first communication circuit 223a of the power reception device 202 using the same or adjacent frequency to a frequency used for power transmission in the transmit coil 211L.

According to various embodiments, the first communication circuit 213a may communicate with the first communication circuit 223a, using the transmit coil 211L. Data (or a communication signal) generated by the first communication circuit 213a may be transmitted using the transmit coil 211L. The first communication circuit 213a may deliver data to the power reception device 202 using a frequency shift keying (FSK) modulation scheme. According to an embodiment, the first communication circuit 213a may communicate with the first communication circuit 223a of the power reception device 202 by changing a frequency of the power signal delivered via the transmit coil 211L. The first communication circuit 213a may communicate with the first communication circuit 223a of the power reception device 202 by including data or a communication signal in the power signal generated by the power generation circuit 211b. For example, the first communication circuit 213a may represent data by increasing or decreasing a frequency of the power transmission signal.

According to various embodiments, the first communication circuit 213a may transmit and receive pieces of information necessary for wireless power transmission through in-band communication with the first communication circuit 223a. For example, the in-band communication may refer to transmitting data between the first communication circuit 213a and the first communication circuit 223a by means of frequency modulation of the wireless power transmission signal.

According to various embodiments, the first communication circuit 213a may communicate with the first communication circuit 223a using the same or adjacent frequency to a frequency used for power transmission in the transmit coil 211L. For example, the first communication circuit 213a may FSK-modulate a parameter of the power transmission device 201 and may transmit the signal (e.g., a parameter packet) FSK-modulating the parameter together with a power signal. The first communication circuit 213a may deliver data to the first communication circuit 223a using FSK modulation.

According to various embodiments, a transmission power signal of the power transmission device 201 may be a wireless signal (e.g., a radio signal) in, for example, a range of about 110 kHz to 190 kHz. For example, the first communication circuit 213a may, for example, generate a band signal near 40.2% to 5% compared to the band of the transmission power signal, for example, 104.5 to 199.5 kHz. In performing FSK modulation, the first communication circuit 213a may perform the modulation to be a signal of a frequency higher than the frequency of the transmission power signal for a positive signal, for example, a frequency (e.g., 110.7 kHz) higher than 110 kHz, when the power transmission frequency is 110 kHz. For another example, the first communication circuit 213a may perform modulation to be a signal of a frequency lower than the frequency of the power signal for a negative signal, for example, a frequency (e.g., 109.6 kHz) lower than 110 kHz, when the power transmission frequency is 110 kHz.

According to an embodiment, the parameter packet of the power transmission device 201 may include identification information of the power transmission device 201, battery information, information about a travel adapter (TA) connected to the power transmission device 201, power information capable of being supplied based on the battery and the TA information, or a transmission mode (e.g., voltage, current, or power) information.

According to various embodiments, the second communication circuit 213b may communicate with, for example, a second communication circuit 223b of the power reception device 202 using a frequency different from the frequency used for power transmission in the transmit coil 211L (e.g., an outband scheme). For example, the second communication circuit 213b may obtain information (e.g., a charging power input to a battery 221e, various packets, a message, or the like) associated with a state of charge from the second communication circuit 223b using any of various short range communication schemes such as, for example, and without limitation, Bluetooth, Bluetooth low energy (BLE), and Wi-Fi, near field communication (NFC), or the like.

According to an embodiment, the sensing circuit 214 may include at least one or more sensors and may detect at least one state of the power transmission device 201 using the at least one or more sensors.

According to an embodiment, the sensing circuit 214 may include, for example, and without limitation, at least one of a temperature sensor, a motion sensor, a current (or voltage) sensor, or the like, and may detect a temperature state of the power transmission device 201 using the temperature sensor, may detect a motion state of the power transmission device 201 using the motion sensor, and may detect a state of an output signal of the power transmission device 201, for example, a current magnitude, a voltage magnitude, or a power magnitude, using the current (or voltage) sensor.

According to various embodiments, the current (or voltage) sensor may measure a signal in the power transmission circuit 211. For example, a signal may be measured in at least a portion of the matching circuit 211c or the power generation circuit 211b. The current (or voltage) sensor may include a circuit which measures a signal in a previous stage of the coil 211L. The current (or voltage) sensor may measure an input voltage Vdd applied to the power generation circuit 211b.

According to various embodiments, the sensing circuit 214 may include, for example, a circuit for foreign object detection (FOD).

According to an embodiment, the power reception device 202 (e.g., the electronic device 101 of FIG. 1) may include a power reception circuit 221 (e.g., a power management module 188), a control circuit 222 (e.g., a processor 120), a communication circuit 223 (e.g., a communication module 190), a sensor circuit 224 (e.g., a sensor module 176), a display 225 (e.g., a display device 160), or a detecting circuit 226. In the power reception device 202, a description of the configuration corresponding to the power transmission device 201 may be not be entirely repeated.

According to an embodiment, the power reception circuit 221 may include a receive coil 221L for wirelessly receiving power from the power transmission device 201, a matching circuit 221a, a rectifier circuit 221b for rectifying the received AC power to DC, a regulator circuit 221c for regulating a charging voltage, a switch circuit 221d, or a battery 221e (e.g., a battery 189).

According to an embodiment, the control circuit 222 may perform the overall control of the power reception device 202 and may generate and deliver various messages necessary for wireless power transmission to the communication circuit 223. For example, the control circuit 222 may generate charging power information, a power increase request message, or a power decrease request message of the power reception circuit 221.

According to an embodiment, the communication circuit 223 may include at least one of a first communication circuit 223a or a second communication circuit 223b. The first communication circuit 223a may communicate with the power transmission device 201 via the receive coil 221L.

According to various embodiments, the first communication circuit 223a may communicate with the first communication circuit 213a, using the receive coil 221L. Data (or a communication signal) generated by the first communication circuit 223a may be transmitted using the receive coil 221L. The first communication circuit 223a may deliver data to the power transmission device 201 using an amplitude shift keying (ASK) modulation scheme. The second communication circuit 223b may communicate with the power transmission device 201 using any of various short range communication schemes such as, for example and without limitation, Bluetooth, BLE, Wi-Fi, NFC, or the like.

According to an embodiment, the sensor circuit 224 may include at least one or more sensors and may detect at least one state of the power reception device 202 using the at least one or more sensors.

According to an embodiment, the sensor circuit 224 may include, for example, and without limitation, at least one of a temperature sensor, a motion sensor, and/or a current (or voltage) sensor, and may detect a temperature state of the power reception device 202 using the temperature sensor, may detect a motion state of the power reception device 202 using the motion sensor, and may detect a state of a receive signal of the power reception device 202, for example, a current magnitude, a voltage magnitude, or a power magnitude, using the current (or voltage) sensor.

According to various embodiments, the sensor circuit 224 may include a detecting circuit 226 (e.g., a current (or voltage) sensor). The detecting circuit 226 may measure a signal in the power reception circuit 221. For example, a signal may be measured in at least a portion of the matching circuit 221a, the rectifier circuit 221b, the regulator circuit 221c, the switch circuit 221d, or the battery 221e. The detecting circuit 226 may measure a rectified voltage Vrect output from the rectifier circuit 221b, a regulated voltage Vout in the regulator circuit 221c, or a charging voltage Vbs applied to the battery 221e. According to various embodiments, the detecting circuit 226 may be included in the power reception circuit 221.

Figure 3A:
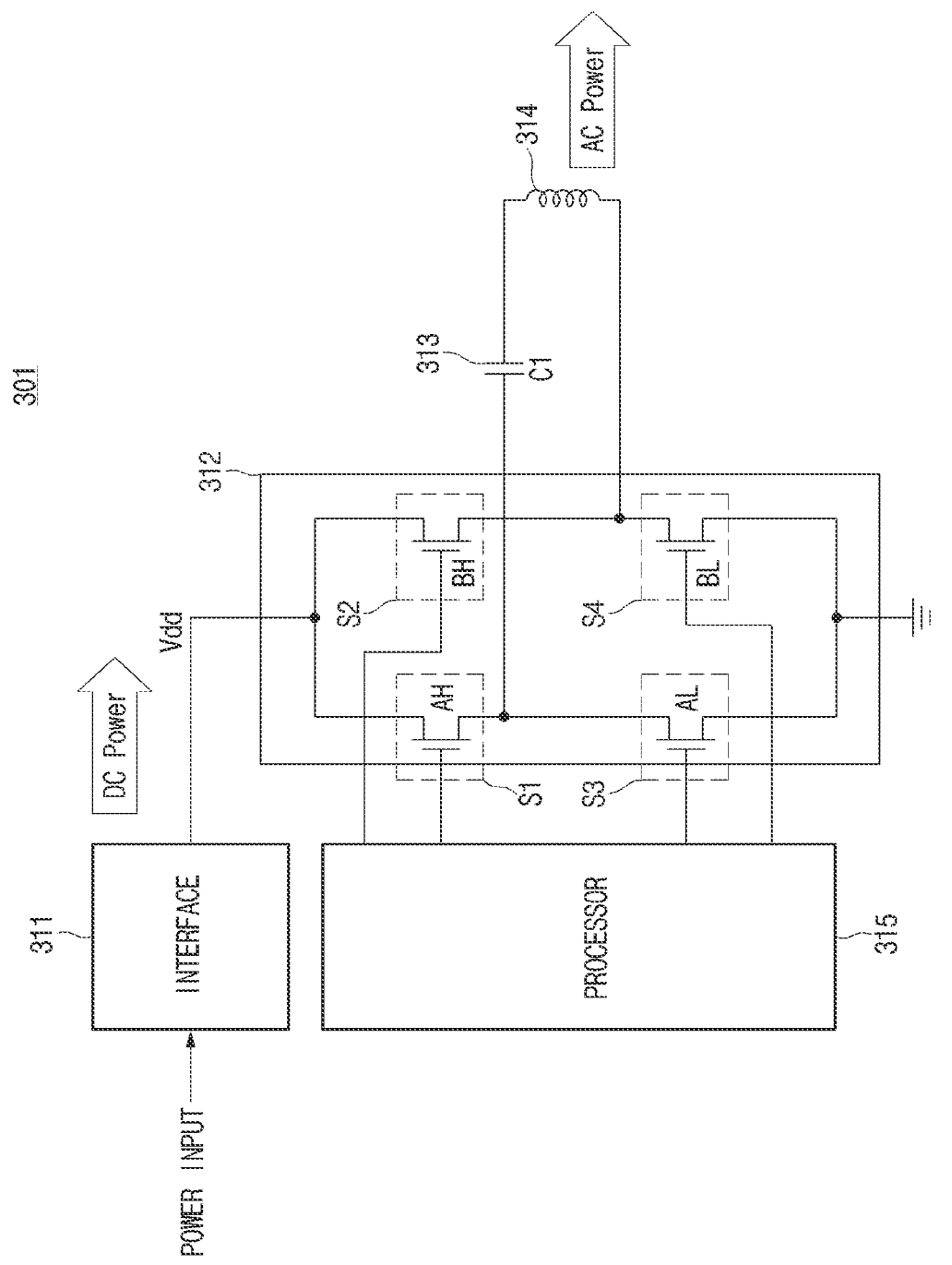
FIG. 3A is a diagram illustrating an example configuration of a power transmission device in a wireless charging system according to various embodiments.

FIG. 3A is a diagram illustrating an example configuration of a power transmission device 301 in a wireless charging system according to various embodiments.

Referring to FIG. 3A, a power transmission device 301 (e.g., a power transmission device 201) may include an interface (e.g., including circuitry) 311 (e.g., a power adapter 211a), a power generation circuit 312 (e.g., a power generation circuit 211b), a matching circuit 313 (e.g., a matching circuit 211c), a transmit coil 314 (e.g., a transmit coil 211L), and a processor (e.g., including processing circuitry) 315 (e.g., a control circuit 212).

According to an embodiment, the interface 311 may be connected with a power supply device (e.g., a travel adapter or a power supply) and may receive power from the power supply device. For example, the interface 311 may deliver the power, input from the power supply device, to the processor 315 and the power generation circuit 312. The interface 311 may change a magnitude of an input voltage Vdd delivered to the power generation circuit 312 under control of the processor 315. The interface 311 may be included in a power adapter 211a of FIG. 2.

According to an embodiment, the interface 311 (e.g., a power management IC (PMIC)) may receive power from an external power device and may supply power to the power generation circuit 312. For example, the interface 311 may control an input voltage Vdd or an input current supplied to the power generation circuit 312.

In FIG. 3A, the power transmission device 301 does not show the power supply device, but is not limited thereto. For example, the power transmission device 301 may include the power supply device. According to an embodiment, the power supply device may convert an alternating current (AC) power into a direct current (DC) power and may deliver the converted DC power to the interface 311.

According to an embodiment, the power generation circuit 312 may include a DC-AC converter circuit. For example, as shown in FIG. 3A, the power generation circuit 312 may be configured as a full bridge circuit including four switches. However, the disclosure is not limited thereto.

According to an embodiment, the power generation circuit 312 may receive a control signal from the processor 315 and may convert a DC power into an AC power, based on at least a portion of the received control signal. For example, when a control signal having a high level is applied to a gate AH of a switch S1 and a gate BL of a switch S4 and when a control signal having a low level is applied to a gate BH of a switch S2 and a gate AL of a switch S3, the switch S1 and the switch S4 may be turned on and the switch S2 and the switch S3 may be turned off. When the switch S1 and the switch S4 are turned on and when the switch S2 and the switch S3 are turned off, the power generation circuit 312 may output power having the same sign as the DC power input from the interface 311 to the power generation circuit 312. For example, when the DC power input from the interface 311 to the power generation circuit 312 has a positive sign, a positive voltage may be output between a source of the switch S1 (or a drain of the switch S3) and a drain of the switch S4 (or a source of the switch S2). When a control signal having a low level is applied to the gate AH of the switch S1 and the gate BL of the switch S4 and when a control signal having a high level is applied to the gate BH of the switch S2 and the gate AL of the switch S3, the switch S1 and the switch S4 may be turned off and the switch S2 and the switch S3 may be turned on. When the switch S1 and the switch S4 are turned off and when the switch S2 and the switch S3 are turned on, the power generation circuit 312 may output power having a sign opposite to the DC power input from the interface 311 to the power generation circuit 312. As the switches S1, S2, S3, and S4 periodically perform turn-on and turn-off operations, the power generation circuit 312 may convert a DC power into an AC power.

In FIG. 3A, by way of non-limiting example, the switch includes an re-channel metal oxide semiconductor field effect transistor (NMOS FET), but not limited thereto. For example, the switch may include a FET, a bipolar junction transistor (BJT), or the like other than the NMOS FET.

According to an embodiment, the power generation circuit 312 may be the same as or similar to at least in part to a power generation circuit 211b of FIG. 2.

According to an embodiment, the matching circuit 313 may maximize efficiency between the transmit coil 314 and a receive coil (e.g., a receive coil 221L) of a power reception device (e.g., a power reception device 202) and may include a matching element. In FIG. 3A, it is exemplified that the matching circuit 313 includes the capacitor C1, but not limited thereto. As various embodiments, the matching circuit 313 may include an element such as an inductor or a resistor other than the capacitor C1.

According to an embodiment, the transmit coil 314 may transmit power to the receive coil of the power reception device. For example, the transmit coil 314 may be formed of a conductive material.

According to an embodiment, the processor 315 may include various processing circuitry and control overall operation of the power transmission device 301. For example, the processor 315 may perform the same or similar function to at least a portion of a function performed by a control circuit 212 of FIG. 2.

FIG. 3A illustrates the power transmission device 301 which wirelessly transmits power in a wireless power transfer electromagnetic inductive coupling method, but is not limited thereto. For example, the wireless charging method according to various embodiments of the disclosure may be applied to a wireless power transfer electromagnetic resonance method or an electromagnetic method in the same or similar manner.

Figure 3B:
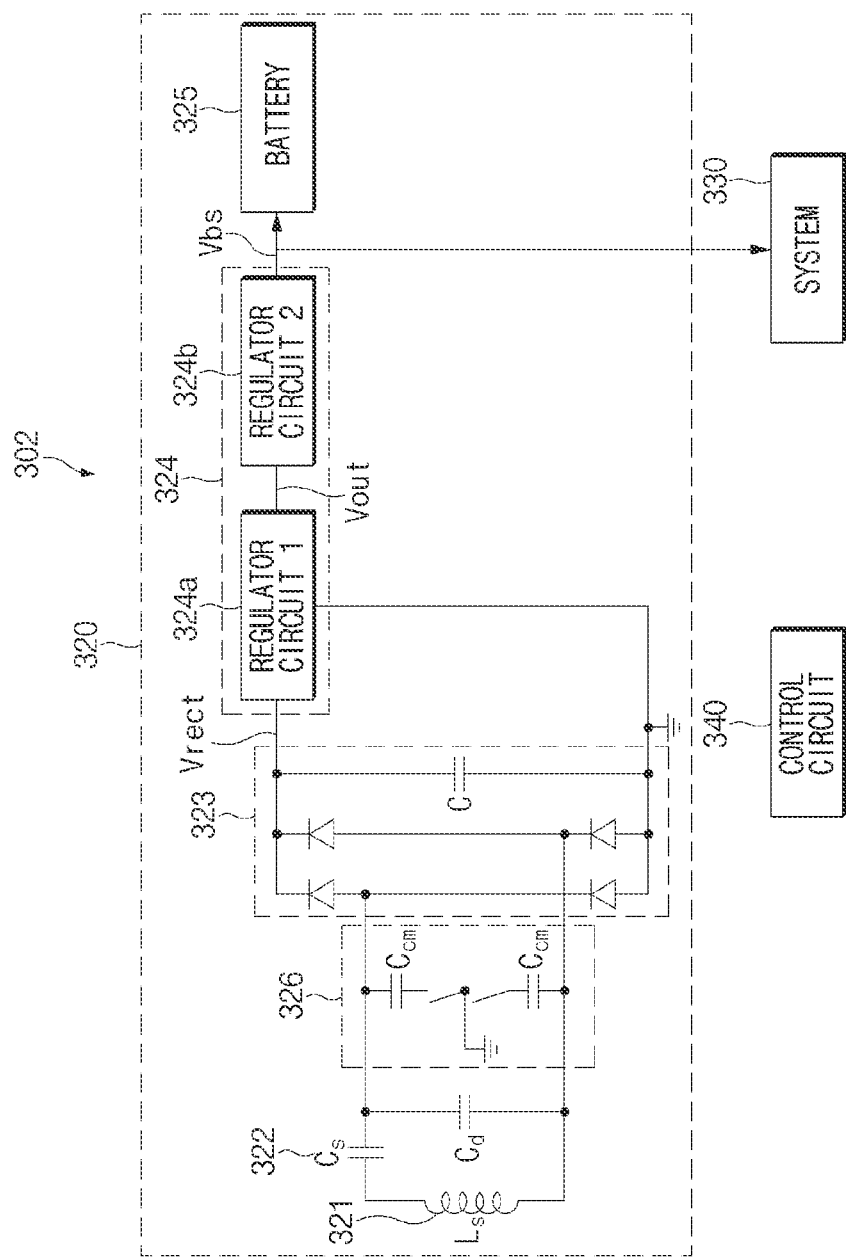
FIG. 3B is a diagram illustrating an example configuration of a power reception device in a wireless charging system according to various embodiments.

FIG. 3B is a diagram illustrating an example configuration of a power reception device 302 in a wireless charging system according to various embodiments.

Referring to FIG. 3B, a power reception device 302 (e.g., a power reception device 202) may include a power reception circuit 320 (e.g., a power reception circuit 221), a system 330, and a control circuit 340 (e.g., a control circuit 222). The power reception circuit 320 may include a receive coil 321 (e.g., a receive coil 221L), a matching circuit 322 (e.g., a matching circuit 221a), a rectifier circuit 323 (e.g., a rectifier circuit 221b), a regulator circuit 324 (e.g., a regulator circuit 221c) for regulating a charging voltage, a battery 325 (e.g., a battery 221e), and a communication circuit 326 (e.g., a first communication circuit 223a).

According to an embodiment, the receive coil 321 may wirelessly receive power from a transmit coil (e.g., a transmit coil 314) of a power transmission device (e.g., a power transmission device 301). For example, the receive coil 321 may be formed of a conductive material.

According to an embodiment, the matching circuit 322 may maximize efficiency between the receive coil 321 and the transmit coil of the power transmission device and may include a matching element. In FIG. 3B, it is exemplified that the matching circuit 322 includes the capacitor Cs, but not limited thereto. As various embodiments, the matching circuit 322 may include an element such as an inductor or a resistor other than the capacitor Cs.

According to an embodiment, the rectifier circuit 323 may rectify the received AC power to DC to output a rectified voltage Vrect. For example, the rectifier circuit 323 may include a plurality of diodes. The received AC power may be converted into a DC power rectified through the plurality of diodes.

According to an embodiment, the regulator circuit 324 may regulate a charging voltage Vbs. According to an embodiment, the regulator circuit 324 may include a first regulator circuit 324a and a second regulator circuit 324b.

The first regulator circuit 324a may receive the rectified voltage Vrect to generate a stable output voltage (e.g., a regulated voltage (Vout)). The first regulator circuit 324a may include a low drop out (LDO). The second regulator circuit 324b may receive the regulated voltage Vout to generate a charging voltage Vbs supplied to the battery 325 or the system 330. The second regulator circuit 324b may include a charging circuit (e.g., a charger) or a PMIC.

According to an embodiment, the control circuit 340 may perform the overall control of the power reception device 302 and may generate and deliver various messages necessary for wireless power transmission to the power transmission 301 using the communication circuit 326. For example, the control circuit 340 may generate charging power information, a power increase request message, or a power decrease request message of the power reception circuit 320.

According to an embodiment, the communication circuit 326 may communicate with the power transmission device using the receive coil 321. Data (or a communication signal) generated by the communication circuit 326 may be transmitted using the receive coil 321. The communication circuit 326 may deliver data to the power transmission device using an amplitude shift keying (ASK) modulation scheme.

Figure 4:
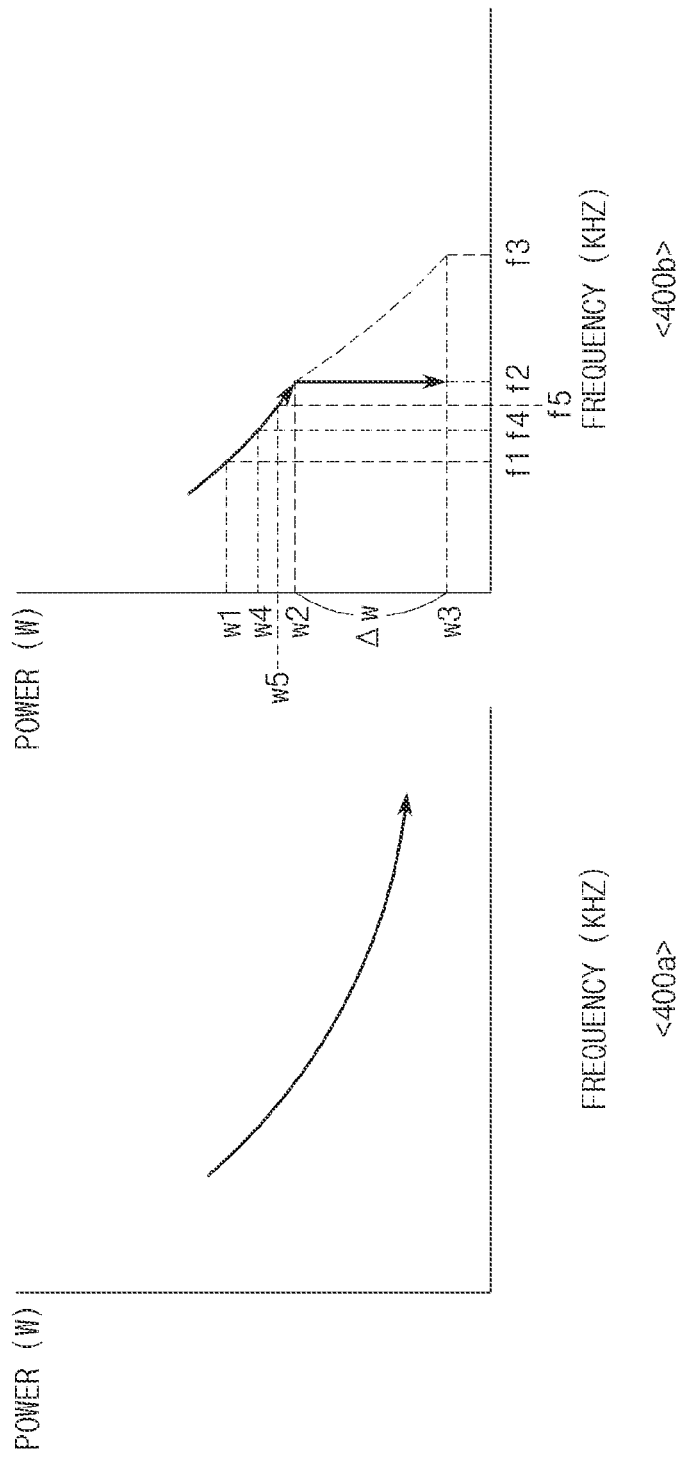
FIG. 4 is a diagram including graphs illustrating an example wireless charging method according to various embodiments.

FIG. 4 is a diagram including graphs illustrating a wireless charging method according to various embodiments.

Referring to FIGS. 3A, 3B, and 4, on a graph 400a, a power transmission device 301 may adjust (or control) a frequency of a transmit power to adjust power (hereinafter referred to as 'transmit power') (or the amount of power, (the amount of) effective power, or (the amount of) average power) to be supplied to a power reception device 302. For example, the more the frequency of the transmit power increases, the more the transmit power (or the amount of transmit power) may decrease. The more the frequency of the transmission power decreases, the more the transmit power may increase. For example, when the frequency of the transmit power increases on the graph 400a, the transmit power may decrease.

According to an embodiment, when determining (or calculating) the transmit power as being less than or equal to a specified threshold power, the power transmission device 301 may determine a frequency (hereinafter referred to as 'specified frequency') corresponding to the specified threshold power as a frequency of the transmit power. When determining the specified frequency as the frequency of the transmit power, the power transmission device 301 may adjust at least one of a phase or a duty cycle (e.g., a period repeated within one second) of a control signal for controlling a power generation circuit 312.

According to an embodiment, when determining the transmit power as being greater than the specified threshold power, the power transmission device 301 may determine a frequency of the transmit power, corresponding to the transmit power. For example, the power transmission device 301 may have a phase and a duty cycle, which are set to a default, and may determine (or calculate) a frequency (or a frequency magnitude or a frequency value) capable of generating (the amount of) transmit power. When the transmit power is determined as being in a range greater than the specific threshold power, the power transmission device 301 may generate a transmit power which has a phase and a duty cycle, which are set to a default, and has a frequency corresponding to the transmit power. The phase and the duty cycle, which are set to the default, may be a phase and a duty cycle at a duty ratio of 50%, in which a time interval when a control signal having a high level is applied to a gate AH of a switch S1 and a gate BL of a switch S4 and a time interval when a control signal having a high level is applied to a gate BH of a switch S2 and a gate AL of a switch S3 are not overlapped (or duplicated). Herein, the phase and the duty cycle, which are set to the default, are not limited thereto.

According to an embodiment, on a graph 400b, when determining the transmit power as W1 (W) greater than a specified threshold power W2 (W), the power transmission device 301 may determine a frequency of the transmit power as a frequency f1 corresponding to W1 (W). When determining the transmit power as W1 (W) greater than the specified threshold power W2 (W), the power transmission device 301 may maintain a phase and a duty cycle of a control signal for controlling the power generation circuit 312 as the phase and the duty cycle (e.g., a duty cycle at a duty ratio of 50%), which are set to the default.

According to an embodiment, when determining the transmit power (or the amount of power) as W3 (W) less than the specified threshold power W2 (W), the power transmission device 301 may determine a frequency of the transmit power as a specified frequency f2 corresponding to the specified threshold power W2 (W) rather than a frequency f3 corresponding to W3 (W). Herein, the frequency f3 may be a frequency of the transmit power for calculating the transmit power as W3 (W), when a phase and a duty cycle of a control signal for controlling the power generation circuit 312 are set to a default (e.g., a duty cycle at a duty radio of 50%) in an existing technology.

According to an embodiment, in the state where the power transmission device 301 determines the frequency of the transmit power having W3 (W) as f2, the power transmission device 301 may adjust at least one of the phase or the duty cycle of the control signal for controlling the power generation circuit 312 to decrease power by, for example, power ΔW corresponding to a difference between the power W2 (W) corresponding to f2 and the power W3 (W) corresponding to f3 to generate the transmit power as W3 (W).

For example, to decrease (or compensate for) power by the power ΔW corresponding to the difference between the power W2 (W) and the power W3 (W), the power transmission device 301 may deliver control signals to the gates AH, BL, BH, and AL, such that the time interval when the control signal having the high level is applied to the gate AH of the switch S1 and the gate BL of the switch S4 and the time interval (hereinafter referred to as 'overlapped time interval') when the control signal having the high level is applied to the gate BH of the switch S2 and the gate AL of the switch S3. For example, the power transmission device 301 may deliver the control signals to the gates AH, BL, BH, and AL such that the larger the power ΔW, the longer the overlapped time interval.

According to various embodiments, the power transmission device 301 may decrease (e.g., a duty cycle at a duty ratio of 20% or 30%) a duty cycle of the control signal for controlling the power generation circuit 312 to decrease power by the power ΔW corresponding to the difference between the power W2 (W) and the power W3 (W). For example, the power transmission device 301 may reduce a turn-on time of at least two (S1 and S4 or S2 and S3) of switches S1 to S4 of the power generation circuit 312 to decrease power by the power ΔW corresponding to the difference between the power W2 (W) and the power W3 (W). For example, the power transmission device 301 may deliver the control signals to the gates AH, BL, BH, and AL such that the larger the power ΔW, the more the duty cycle of the control signal for controlling the power generation circuit 312 decreases.

According to various embodiments, the power transmission device 301 may decrease a duty cycle at the same time as setting the overlapped time interval to decrease power by the power ΔW corresponding to the difference between the power W2 (W) and the power W3 (W). For example, assuming that ΔW is power obtained by adding ΔW1 to ΔW2, the power transmission device 301 may set the overlapped time interval to decrease a transmit power by ΔW1 and may decrease a duty cycle to reduce a transmit power by ΔW2. Herein, the power transmission device 301 may deliver control signals to the gates AH, BL, BH, and AL, such that the larger the power ΔW, the more the overlapped time interval increases or the more the duty cycle decreases, or such that the larger the power ΔW, the more the overlapped time interval increases and the more the duty cycle decreases at the same time.

According to an embodiment, the frequency of the transmit power may be the same as a frequency of the control signal for controlling the power generation circuit 312. Hereinafter, a description will be given of a method for adjusting a frequency of the control signal for controlling the power generation circuit 312. However, a frequency of a transmit power corresponding to the frequency of the control signal for controlling the power generation circuit 312 may also be adjusted (or changed).

To comply with international standards and reduce electromagnetic interference (EMI), according to an embodiment, a transmit power may be controlled using a frequency dithering method. For example, the power transmission device 301 may determine a frequency, which varies in a specified range (or a specified frequency range), as a frequency of a transmit power and may adjust at least one of a phase and a duty cycle of the control signal for controlling the power generation circuit 312, based at least in part on the transmit power and the varied frequency. On a graph 400b, when the transmit power is determined (or calculated) as W3 (W), the power transmission device 301 may determine a frequency as a frequency of a transmit power in a manner which repeatedly decreases and increases (or increase and decrease) the frequency within a specified frequency range, for example, a frequency range between f2 and f4. Furthermore, to generate a transmit power having a frequency which varies in a specified range, the power transmission device 301 may adjust at least one of the phase and the duty cycle of the control signal for controlling the power generation circuit 312.

Figure 5A:
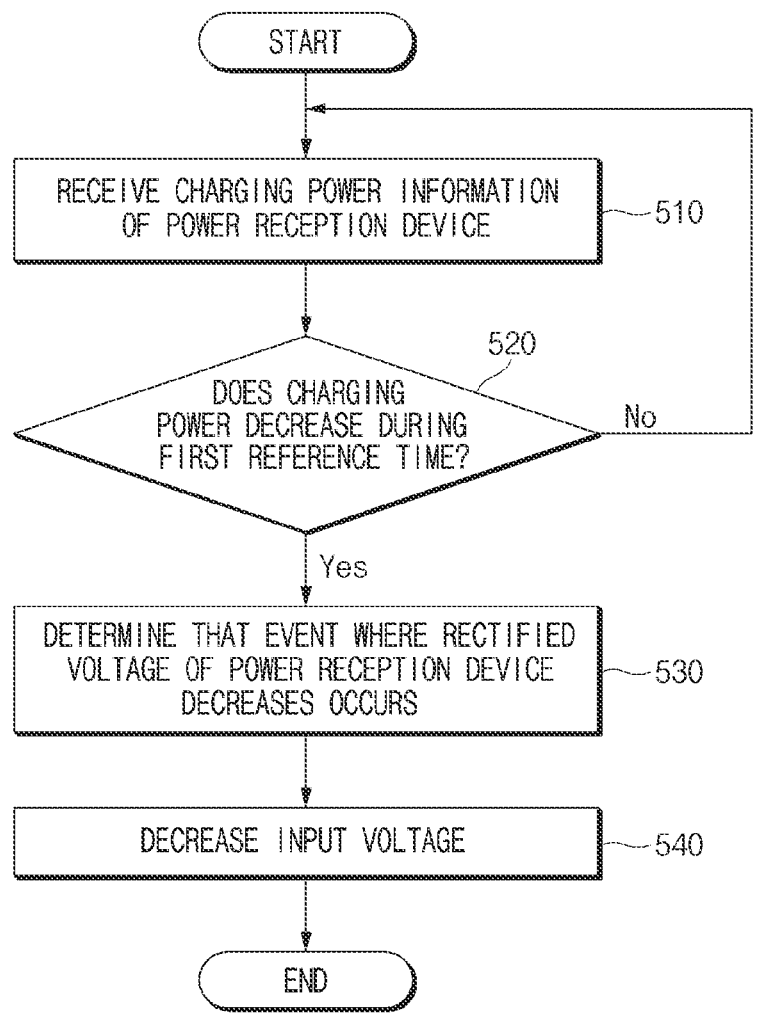
FIG. 5A is a flowchart illustrating an example operation of a power transmission device when a voltage drop event of a power reception device occurs according to various embodiments.
Figure 5B:
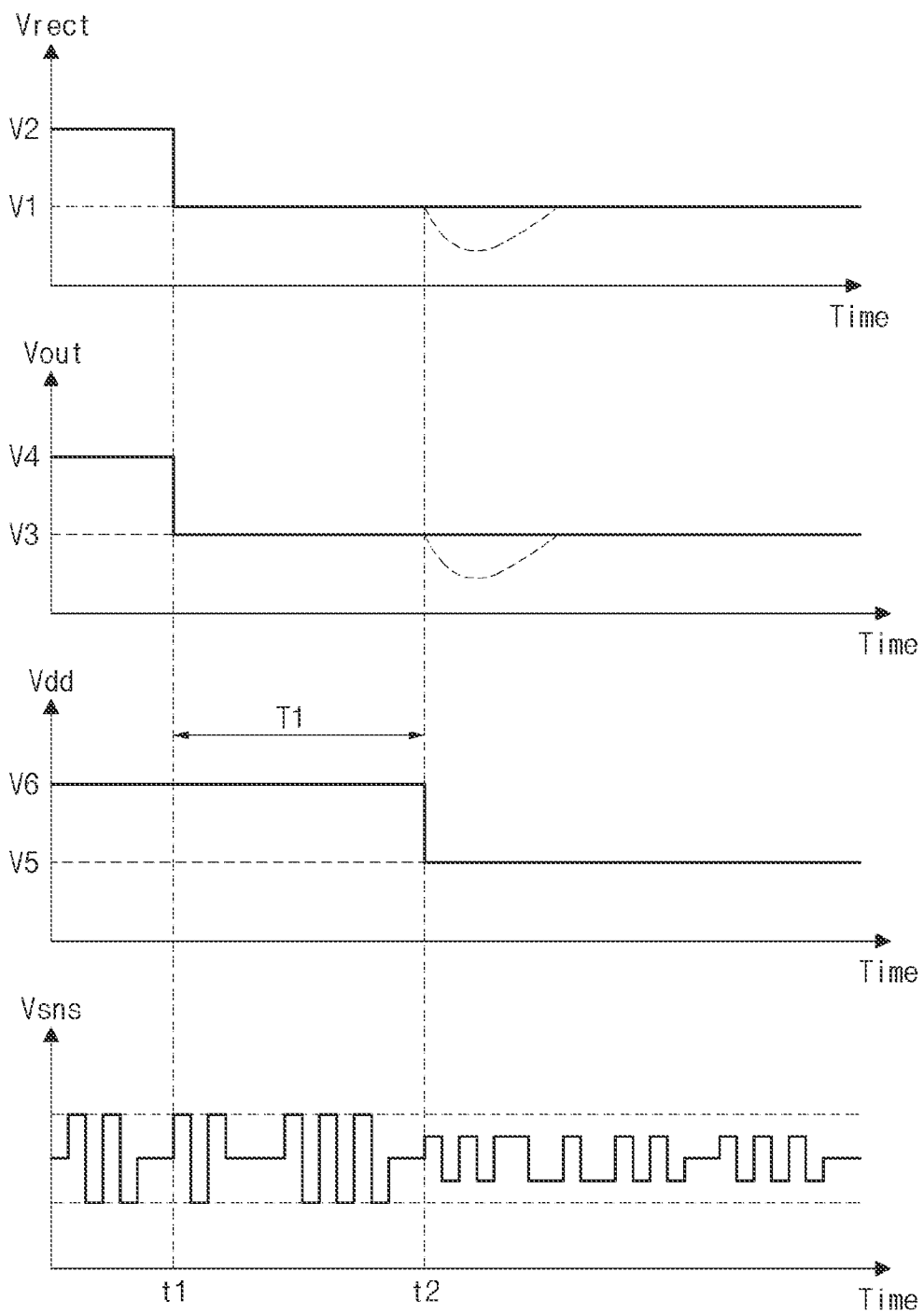
FIG. 5B is a timing diagram illustrating an example operation of a wireless charging system when a voltage drop event of a power reception device occurs according to various embodiments.

FIG. 5A is a flowchart illustrating an example operation of a power transmission device when a voltage drop event of a power reception device occurs according to various embodiments. FIG. 5B is a timing diagram illustrating an example operation of a wireless charging system when a voltage drop event of a power reception device occurs according to various embodiments.

Referring to FIGS. 2, 5A, and 5B, when not receiving a notification of occurrence of a voltage drop event (e.g., heating control or an operation of causing a decrease in a rectified voltage Vrect of a power reception device 202) from the power reception device 202, a power transmission device 201 may detect the voltage drop event of the power reception device 202 and may control a voltage Vdd input to a power generation circuit 211b (hereinafter referred to as input voltage) (e.g., voltage measured between a power adapter 211a and the power generation circuit 211b in FIG. 2 or an output voltage of an interface 311 in FIG. 3).

According to an embodiment, in the power transmission device 201, the power generation circuit 211b may generate a transmit power (e.g., power generated by the power generation circuit 211b) based on the input voltage Vdd.

According to an embodiment, in the power reception device 202, a rectified voltage Vrect of the power reception device 202 may refer, for example, to a voltage measured between a rectifier circuit 221b and a regulator circuit 221c. The regulated voltage Vout may refer, for example, to voltage measured in an internal voltage of the regulator circuit 221c (e.g., voltage measured between a first regulator circuit 324a and a second regulator circuit 324b).

According to an embodiment, in operation 510, the power transmission device 201 may receive charging power information of the power reception device 202. For example, the power transmission device 201 may periodically receive the charging power information from the power reception device 202. Furthermore, the power transmission device 201 may receive a power increase request or a power decrease request from the power reception device 202. The power transmission device 201 may increase or decrease a transmit power depending on the power increase request or the power decrease request.

According to various embodiments, the voltage drop event may occur at a first time t1 in the power reception device 202. According to the occurrence of the voltage drop event, power (or a charging power) supplied to a battery or a system may drop in the regulator circuit 221c (e.g., the second regulator circuit 324b, a charger, or a power management IC). For example, when the voltage drop event occurs, power delivered (or supplied) to the regulator circuit 221c may decrease in the rectifier circuit 221b. The power reception device 202 may lower a rectified voltage Vrect or a regulated voltage Vout depending on the decrease in power. For example, the power reception device 202 may control a FET of the rectifier circuit 221b to lower the rectified voltage Vrect from V2 (e.g., about 10 V) to V1 (e.g., about 5 V). The power reception circuit 202 may control the regulator circuit 221c (e.g., the first regulator circuit 324a or a low drop out (LDO)) to lower the regulated voltage Vout from V4 (e.g., about 10 V) to V3 (e.g., about 5V). However, the power reception device 202 may fail to deliver information about the voltage drop event to the power transmission device 201.

According to various embodiments, the power transmission device 201 may receive charging power information of the power reception device 202, which includes information about a charging power at the first time t1 or after the first time t1. For example, the power transmission device 201 may receive a parameter packet from the power reception device 202 via a first communication circuit 213a.

According to various embodiments, because the charging power decreases at the first time t1 or after the first time t1, the power transmission device 201 may receive a power decrease request from the power reception device 202. When receiving the power decrease request, the power transmission device 201 may reduce a transmit power in a state where the input voltage Vdd is maintained. When reducing the transmit power in the state where the input voltage Vdd is maintained, charging efficiency may drop. With regard to the charging efficiency dropping, more transmit power than the charging power may be delivered to the power reception device 202 after the first time t1 compared to before the first time t1.

According to an embodiment, in operation 520, the power transmission device 201 may determine whether a charging power decreases during a first reference time T1. For example, the power transmission device 201 may measure a transmit power by means of, for example, a sensing circuit 214. The power transmission device 201 may identify a charging power of the power reception device 202 based on the received charging power information.

According to various embodiments, the power transmission device 201 may compare the transmit power with the charging power to identify whether the charging power decrease. The power transmission device 201 may receive charging power information and may compare the charging power information with the transmit power to identify whether the charging power decreases. For example, due to a drop in the charging efficiency, more transmit power than the charging power may be delivered to the power reception device 202 after the first time t1 compared to before the first time t1. Thus, the power transmission device 201 may identify the ratio of the charging power to the transmit power to determine occurrence of a power drop event. For example, when the voltage drop event (e.g., an event where the rectified voltage or the regulated voltage decreases) occurs, the ratio of the charging power to the transmit power may be kept greater than or equal to a reference ratio during a specific time.

According to various embodiments, when the ratio of the charging power to the transmit power is less than the reference ratio, the power transmission device 201 may maintain the input voltage Vdd in a state when sensed (e.g., V6 or 10V, a voltage state before the first time t1, or the input voltage Vdd and the rectified voltage Vrect of the power reception device 202 may be set to the same or similar value when charging starts) and may continue monitoring a change in charging power.

According to an embodiment, when it is identified that the ratio of the charging power to the transmit power is greater than or equal to the reference ratio during a first reference time T1 ("Yes" in operation 520), in operation 530, the power transmission device 201 may determine that the voltage drop event (e.g., the event where the rectified voltage or the regulated voltage decreases) occurs in the power reception device 202. For example, when the ratio of the charging power to the transmit power is kept greater than or equal to the reference ratio above a specified time during the first reference time T1, the power transmission device 201 may configured to determine that the rectified voltage Vrect of the power reception device 202 drops to V1.

According to an embodiment, in operation 540, the power transmission device 201 may decrease the input voltage Vdd. For example, the power transmission device 201 may be configured to change the input voltage Vdd from V6 to V5 at a second time t2 (e.g., a time when the first reference time T1 elapses from the first time W. Thus, the input voltage Vdd may be changed in response to a change in the rectified voltage Vrect or the regulated voltage Vout of the power reception device 202, and the charging efficiency between the power transmission device 201 and the power reception device 202 may be kept to be the same or similar to before the voltage drop event occurs. After the voltage drop event occurs, the charging efficiency between the power transmission device 201 and the power reception device 202 may be improved.

Figure 6:
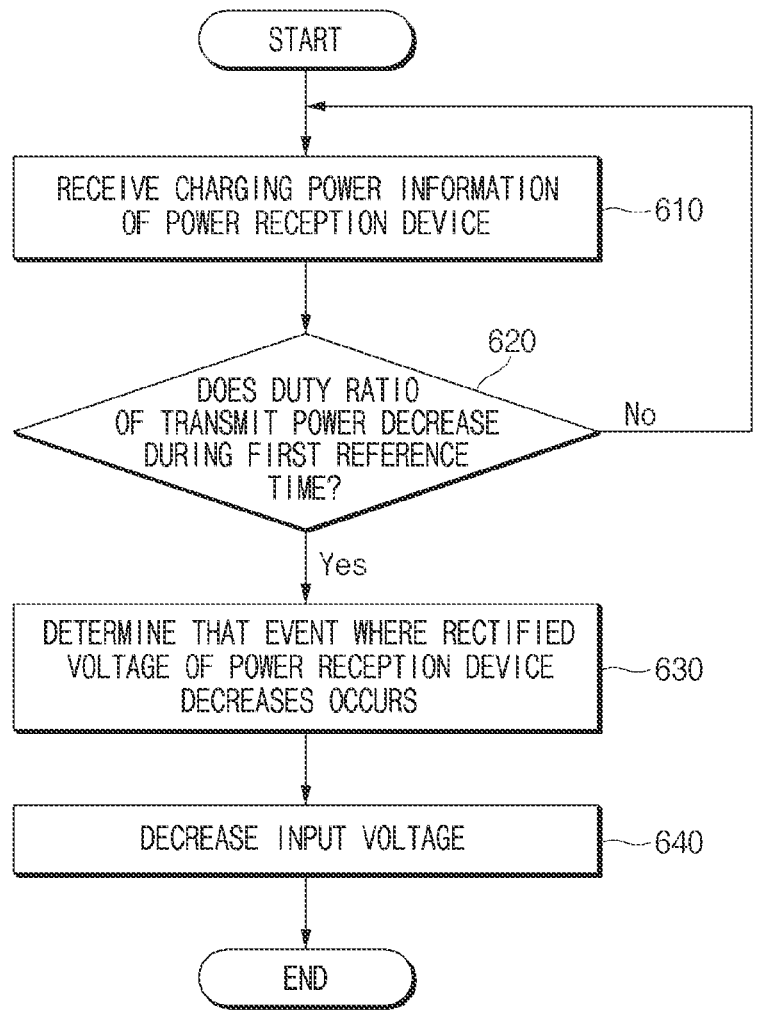
FIG. 6 is a flowchart illustrating an example operation of a power transmission device when a voltage drop event of a power reception device occurs according to various embodiments.

FIG. 6 is a flowchart illustrating an example operation of a power transmission device when a voltage drop event of a power reception device occurs according to various embodiments.

Referring to FIGS. 2, 5B, and 6, when not receiving a notification of occurrence of a voltage drop event (e.g., heating control or an operation of causing a decrease in a rectified voltage Vrect of a power reception device 202) from the power reception device 202, a power transmission device 201 may detect the voltage drop event of the power reception device 202 and may control an input voltage Vdd.

According to an embodiment, in operation 610, the power transmission device 201 may receive charging power information of the power reception device 202. For example, the power transmission device 201 may periodically receive the charging power information from the power reception device 202. Furthermore, the power transmission device 201 may receive a power increase request or a power decrease request from the power reception device 202. The power transmission device 201 may increase or decrease a transmit power depending on the power increase request or the power decrease request.

According to various embodiments, the voltage drop event may occur at a first time t1 in the power reception device 202. According to the occurrence of the voltage drop event, the power reception device 202 may decrease a rectified voltage Vrect from V2 to V1. According to the occurrence of the voltage drop event, the power reception device 202 may decrease a regulated voltage Vout from V4 to V3. However, the power reception device 202 may fail to deliver information about the voltage drop event to the power transmission device 201.

According to various embodiments, the power transmission device 201 may receive charging power information including information about a charging power at the first time t1 or after the first time t1. According to various embodiments, at the first time t1 or after the first time t1, the power transmission device 201 may receive a power decrease request from the power reception device 202.

According to an embodiment, in operation 620, the power transmission device 201 may determine whether a duty ratio of a transmit power decreases during a first reference time T1. For example, a charging power of the power reception device 202 may decrease due to the occurrence of the voltage drop event of the power reception device 202 at the first time t1. The power transmission device 201 may receive a power decrease request from the power reception device 202. When receiving the power decrease request, the power transmission device 201 may reduce a transmit power in a state where the input voltage Vdd is maintained (e.g., where the input voltage Vdd is V6 (about 10 V)). Thus, referring to a graph 400b of FIG. 4, a duty ratio of the transmit power may decrease.

According to an embodiment, the power transmission device 201 may identify whether the duty ratio of the transmit power decreases during a first reference time T1. For example, when the duty ratio of the transmit power is greater than a reference duty ratio (e.g., a duty cycle of 45%) during the first reference time T1, the power transmission device 201 may maintain the input voltage Vdd in a state when sensed (e.g., V6, or the input voltage Vdd and a rectified voltage Vrect of the power reception device 202 may be set to the same or similar value when charging starts) and may continue monitoring a change in duty ratio of the transmit power.

According to an embodiment, when the duty ratio of the transmit power is kept less than or equal to the reference duty ratio above a specific time during the first reference time T1 (e.g., a duty cycle of 20% or 30%) ("Yes" in operation 620), in operation 630, the power transmission device 201 may determine that the voltage drop event (e.g., the event where the rectified voltage or the regulated voltage decreases) occurs in the power reception device 202. For example, when it is identified that the duty ratio of the transmit power is kept less than or equal to the reference duty ratio above the specific time during the first reference time T1, the power transmission device 201 may configured to determine that the rectified voltage Vrect of the power reception device 202 drops to V1.

According to an embodiment, in operation 640, the power transmission device 201 may decrease the input voltage Vdd. For example, the power transmission device 201 may be configured to change the input voltage Vdd from V6 to V5 at a second time t2 (e.g., a time when the first reference time T1 elapses from the first time W. Thus, the input voltage Vdd may be changed in response to a change in the rectified voltage Vrect or the regulated voltage Vout of the power reception device 202, and the charging efficiency between the power transmission device 201 and the power reception device 202 may be kept to be the same or similar to before the voltage drop event occurs. After the voltage drop event occurs, the charging efficiency between the power transmission device 201 and the power reception device 202 may be improved.

Figure 7:
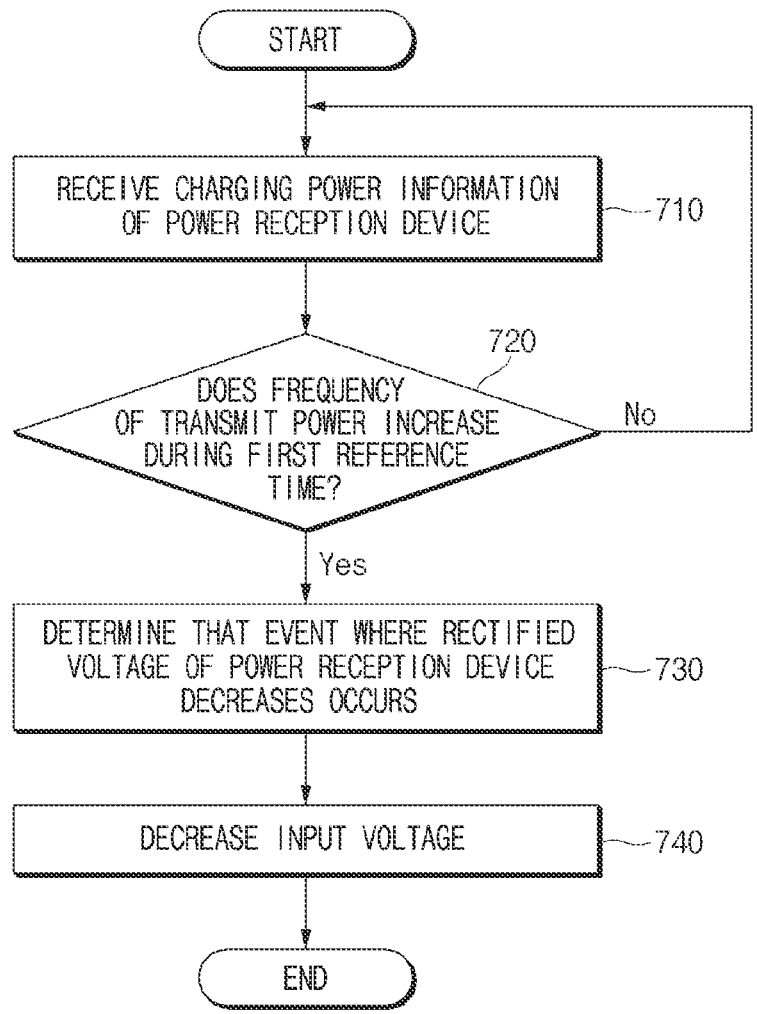
FIG. 7 is a flowchart illustrating an example operation of a power transmission device when a voltage drop event of a power reception device occurs according to various embodiments.

FIG. 7 is a flowchart illustrating an example operation of a power transmission device when a voltage drop event of a power reception device occurs according to various embodiments.

Referring to FIGS. 2, 5B, and 7, when not receiving a notification of occurrence of a voltage drop event (e.g., heating control or an operation of causing a decrease in a rectified voltage Vrect of a power reception device 202) from the power reception device 202, a power transmission device 201 may detect the voltage drop event of the power reception device 202 and may control an input voltage Vdd.

According to an embodiment, in operation 710, the power transmission device 201 may receive charging power information of the power reception device 202. Furthermore, the power transmission device 201 may receive a power increase request or a power decrease request from the power reception device 202. The power transmission device 201 may increase or decrease a transmit power depending on the power increase request or the power decrease request.

According to various embodiments, the voltage drop event may occur at a first time t1 in the power reception device 202. According to the occurrence of the voltage drop event, the power reception device 202 may decrease a rectified voltage Vrect from V2 to V1. According to the occurrence of the voltage drop event, the power reception device 202 may decrease a regulated voltage Vout from V4 to V3. However, the power reception device 202 may fail to deliver information about the voltage drop event to the power transmission device 201.

According to various embodiments, the power transmission device 201 may receive charging power information including information about a charging power at the first time t1 or after the first time t1. According to various embodiments, at the first time t1 or after the first time t1, the power transmission device 201 may receive a power decrease request from the power reception device 202.

According to an embodiment, in operation 720, the power transmission device 201 may determine whether a frequency of a transmit power increases during a first reference time T1. For example, a charging power of the power reception device 202 may decrease due to the occurrence of the voltage drop event of the power reception device 202 at the first time t1. The power transmission device 201 may receive a power decrease request from the power reception device 202. When receiving the power decrease request, the power transmission device 201 may reduce a transmit power in a state where the input voltage Vdd is maintained (e.g., where the input voltage Vdd is V6 (about 10 V)). The input voltage Vdd may reduce the transmit power at V6 (about 10 V).

Thus, referring to a graph 400b of FIG. 4, a frequency of the transmit power may increase.

According to various embodiments, the power transmission device 201 may identify whether the frequency of the transmit power increases during the first reference time T1. For example, when the frequency of the transmit power is less than a reference frequency (e.g., f4 of FIG. 4) during the first reference time T1, the power transmission device 201 may maintain the input voltage Vdd in a state when sensed (e.g., V6, or the input voltage Vdd and a rectified voltage Vrect of the power reception device 202 may be set to the same or similar value when charging starts) and may continue monitoring a change in the frequency of the transmit power.

According to an embodiment, when the frequency of the transmit power is kept greater than or equal to the reference frequency above a specific time during the first reference time T1 (e.g., when the frequency of the transmit power is kept between f5 and f2 of FIG. 4) ("Yes" in operation 720), in operation 730, the power transmission device 201 may determine that the voltage drop event (e.g., the event where the rectified voltage or the regulated voltage decreases) occurs in the power reception device 202. For example, when it is identified that the frequency of the transmit power is kept greater than or equal to the reference frequency above the specific time during the first reference time T1, the power transmission device 201 may configured to determine that the rectified voltage Vrect of the power reception device 202 drops to V1.

According to an embodiment, in operation 740, the power transmission device 201 may decrease the input voltage Vdd. For example, the power transmission device 201 may be configured to change the input voltage Vdd from V6 to V5 at a second time t2 (e.g., a time when the first reference time T1 elapses from the first time W. Thus, the input voltage Vdd may be changed in response to a change in the rectified voltage Vrect or the regulated voltage Vout of the power reception device 202, and the charging efficiency between the power transmission device 201 and the power reception device 202 may be kept to be the same or similar to before the voltage drop event occurs. After the voltage drop event occurs, the charging efficiency between the power transmission device 201 and the power reception device 202 may be improved.

Figure 8A:
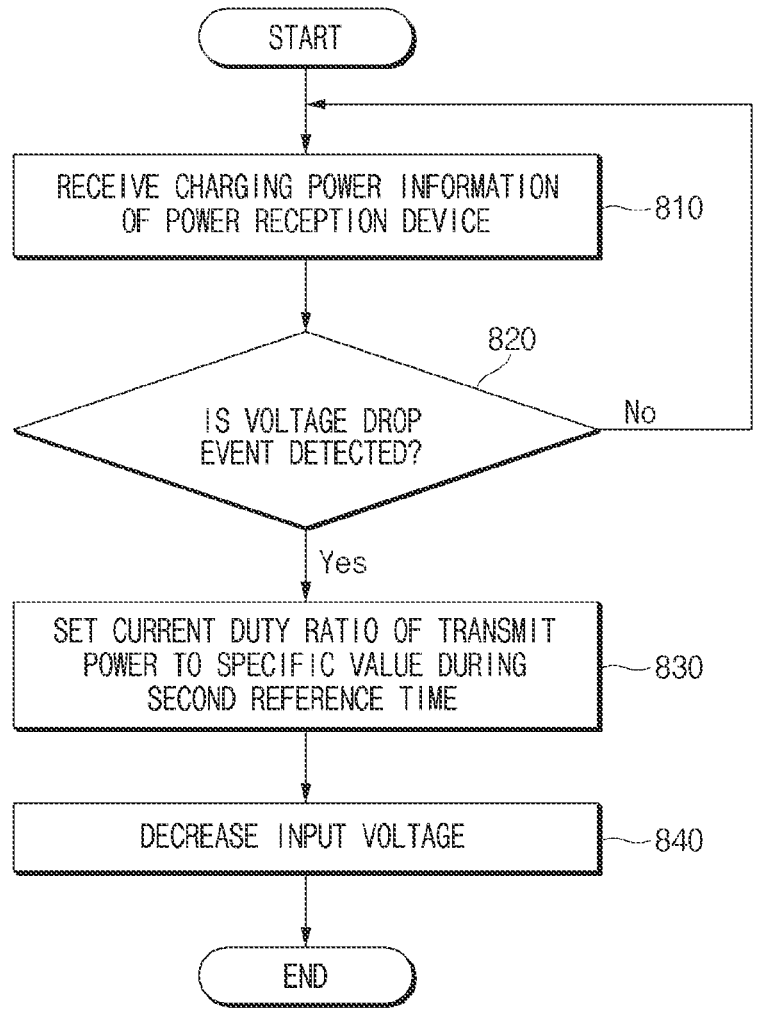
FIG. 8A is a flowchart illustrating an example operation of a power transmission device including a power ensuring operation when a voltage drop event of a power reception device occurs according to various embodiments.
Figure 8B:
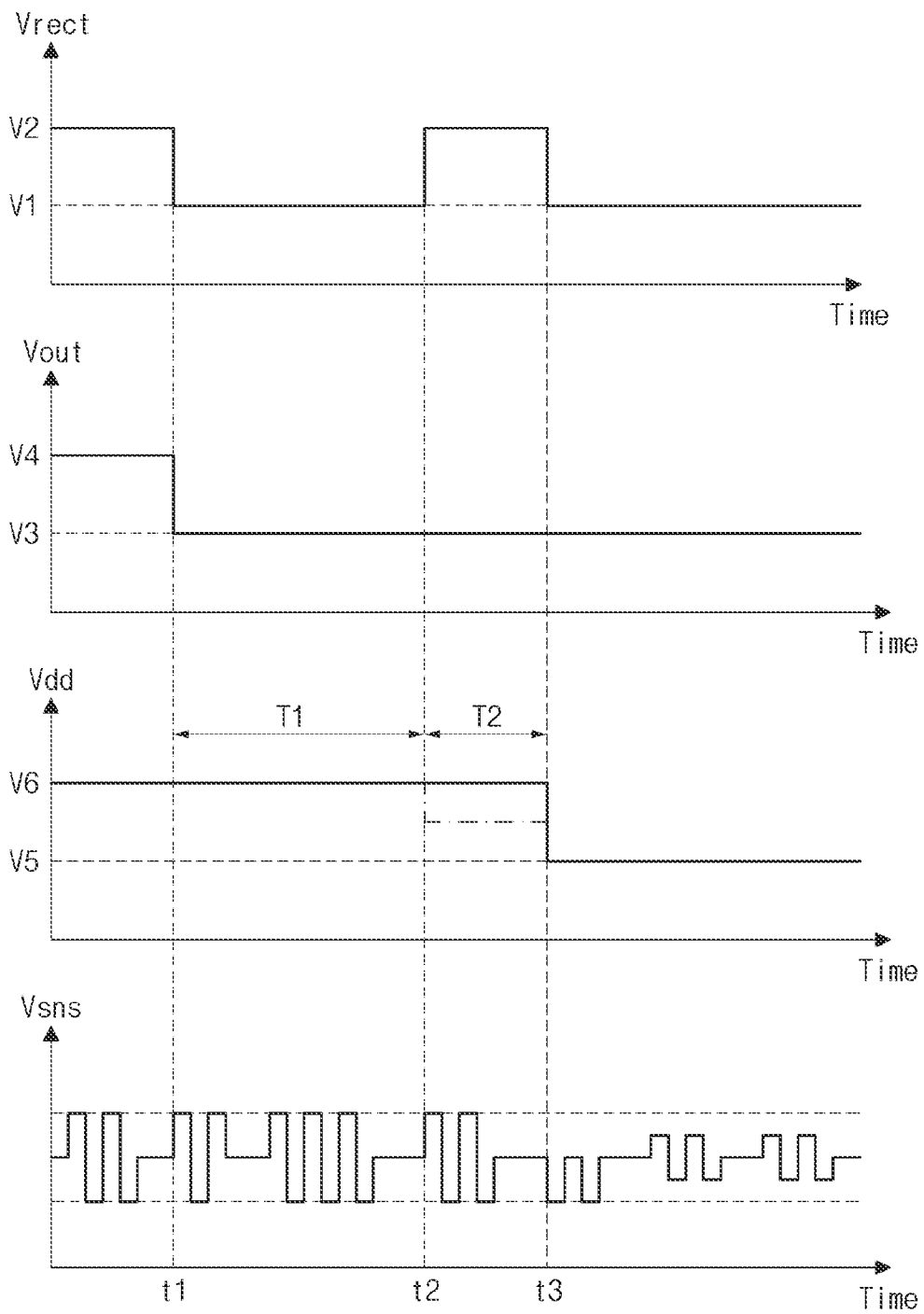
FIG. 8B is a timing diagram illustrating an example operation of a wireless charging system including a power ensuring operation when a voltage drop event of a power reception device occurs according to various embodiments.

FIG. 8A is a flowchart illustrating an example operation of a power transmission device including a power ensuring operation when a voltage drop event of a power reception device occurs according to various embodiments. FIG. 8B is a timing diagram illustrating an example operation of a wireless charging system including a power ensuring operation when a voltage drop event of a power reception device occurs according to various embodiments.

Referring to FIGS. 2, 8A, and 8B, when not receiving a notification of occurrence of a voltage drop event (e.g., heating control or an operation of causing a decrease in a rectified voltage Vrect of a power reception device 202) from the power reception device 202, a power transmission device 201 may detect the voltage drop event of the power reception device 202 and may control an input voltage Vdd. Furthermore, the power transmission device 201 may prevent a drop in rectified voltage Vrect or regulated voltage Vout of the power reception device 202, which is capable of being generated when the input voltage Vdd decreases, by means of the power ensuring operation. Referring to FIG. 5B, when there is no power ensuring operation, the rectified voltage Vrect and the regulated voltage Vout of the power reception device 202 may drop (e.g., a dotted line portion of the rectified voltage Vrect and the regulated voltage Vout in FIG. 5B), when the input voltage Vdd decreases (e.g., after a second time t2 of FIG. 5B).

According to an embodiment, in operation 810, the power transmission device 201 may receive charging power information of the power reception device 202. Furthermore, the power transmission device 201 may receive a power increase request or a power decrease request from the power reception device 202. The power transmission device 201 may increase or decrease a transmit power depending on the power increase request or the power decrease request.

According to various embodiments, the voltage drop event may occur at a first time t1 in the power reception device 202. According to the occurrence of the voltage drop event, the power reception device 202 may decrease the rectified voltage Vrect from V2 to V1. According to the occurrence of the voltage drop event, the power reception device 202 may decrease the regulated voltage Vout from V4 to V3. However, the power reception device 202 may fail to deliver information about the voltage drop event to the power transmission device 201.

According to various embodiments, the power transmission device 201 may receive charging power information including information about a charging power at the first time t1 or after the first time t1. According to various embodiments, at the first time t1 or after the first time t1, the power transmission device 201 may receive a power decrease request from the power reception device 202.

According to an embodiment, in operation 820, the power transmission device 201 may detect the occurrence of the voltage drop event of the power reception device 202. For example, the power transmission device 201 may detect the occurrence of the voltage drop event of the power reception device 202 based on at least one of the methods of FIG. 5A, FIG. 6, or FIG. 7. Thus, the power transmission device 201 may determine the occurrence of the voltage drop event based on the ratio of the charging power to the transmit power. The power transmission device 201 may determine the occurrence of the voltage drop event based on a duty ratio of the transmit power, which is kept during a specific time in a first reference time T1. The power transmission device 201 may determine the occurrence of the voltage drop event based on a frequency of the transmit power, which is kept during the specific time in the first reference time T1. As various embodiments, the power transmission device 201 may determine the occurrence of the voltage drop event based on at least one of the ratio of the charging power to the transmit power, a duty ratio of the transmit power, or a frequency of the transmit power.

According to various embodiments, when the voltage drop event is not detected ("No" in operation 820), the power transmission device 201 may continue monitoring charging power information.

According to an embodiment, when the voltage drop event is detected ("Yes" in operation 820), in operation 830, the power transmission device 201 may set the duty ratio of the transmit power to a specific value during a specific time (e.g., a second reference time T2). For example, the transmit power of the power transmission device 201 may be reduced in response to a decrease in charging power due to the voltage drop event of the power reception device 202, and a duty ratio of the transmit power after a second time t2 may be the same or higher than a duty ratio (e.g., a duty cycle of 20% or 30%) before the second time t2.

According to an embodiment, a duty ratio (e.g., the duty cycle of 20% or 30%) of the transmit power of the power transmission device 201 after the first time t1 may more decrease than before the first time t1 (e.g., a duty cycle of 50%) depending on a decrease in the charging power of the power reception device 202. At the second time t2 when the first reference time T1 elapses from the first time t1, the power transmission device 201 may determine to decrease the input voltage Vdd and may perform the power ensuring operation during the second reference time T2 before decreasing the input voltage Vdd. The power ensuring operation may include increasing a duty ratio (e.g., the duty cycle of 20% or 30%) of the transmit power of a specific time (e.g., the first reference time T1) to fix the duty ratio to a specific duty ratio (e.g., a duty cycle between greater than or equal to a duty ratio of the specific time (e.g., the first reference time T1) and less than or equal to 50%) and maintain the duty ratio during a specific time (e.g., the second reference time T2).

According to various embodiments, the power transmission device 201 may change the input voltage Vdd to between V6 and V5 during the second reference time T2. The power transmission device 201 may adjust a duty ratio of the transmit power in response to the changed input voltage Vdd.

According to various embodiments, while changing the input voltage Vdd to V5 during the second reference time T2, the power transmission device 201 may adjust a duty ratio of the transmit power in response to the changed input voltage Vdd.

According to various embodiments, when the duty ratio of the transmit power is fixed to a specific duty ratio during the second reference time T2, a rectified voltage Vrect of the power reception device 202 may more increase than V1 between the second time t2 and a third time t3, and a necessary charging power may be ensured after the input voltage Vdd decreases.

According to an embodiment, in operation 840, the power transmission device 201 may decrease the input voltage Vdd. For example, the power transmission device 201 may be configured to change the input voltage Vdd, for example, from V6 to V5, at the third time t3. Although the power transmission device 201 decreases the input voltage Vdd at the third time t3, the regulated voltage Vout after the third time t3 may be kept as a constant value, by the power ensuring operation performed during the second reference time T2, in FIG. 8B unlike FIG. 5B.

Figure 9A:
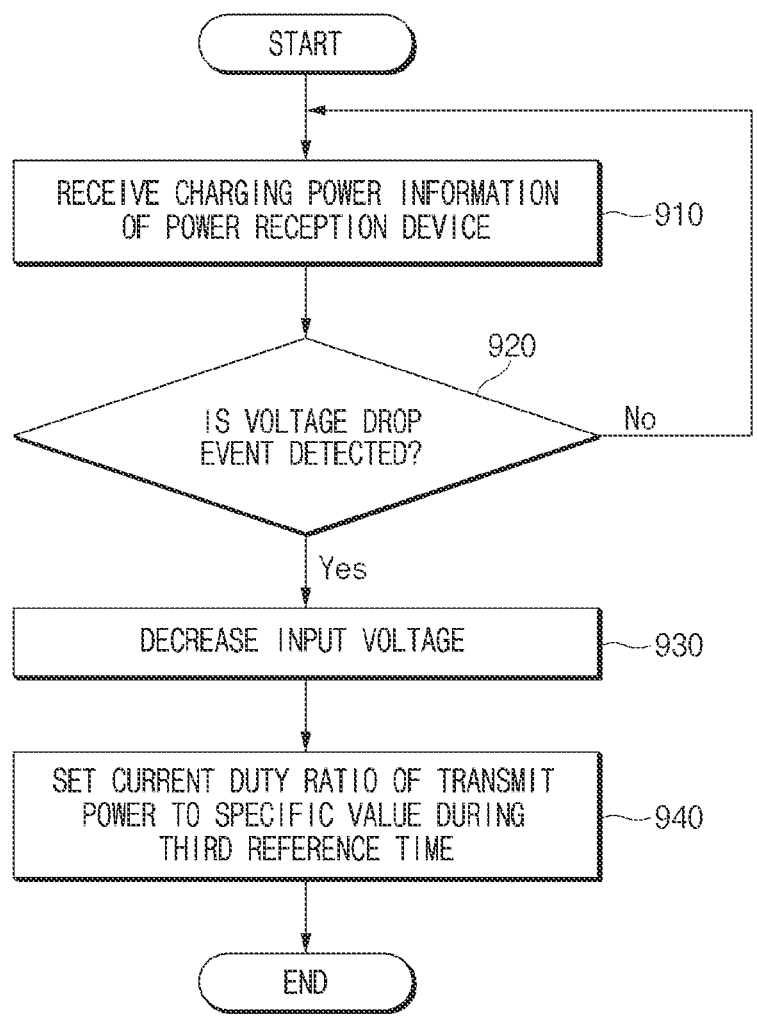
FIG. 9A is a flowchart illustrating an example operation of a power transmission device including a communication error prevention/reduction operation when a voltage drop event of a power reception device occurs according to various embodiments.
Figure 9B:
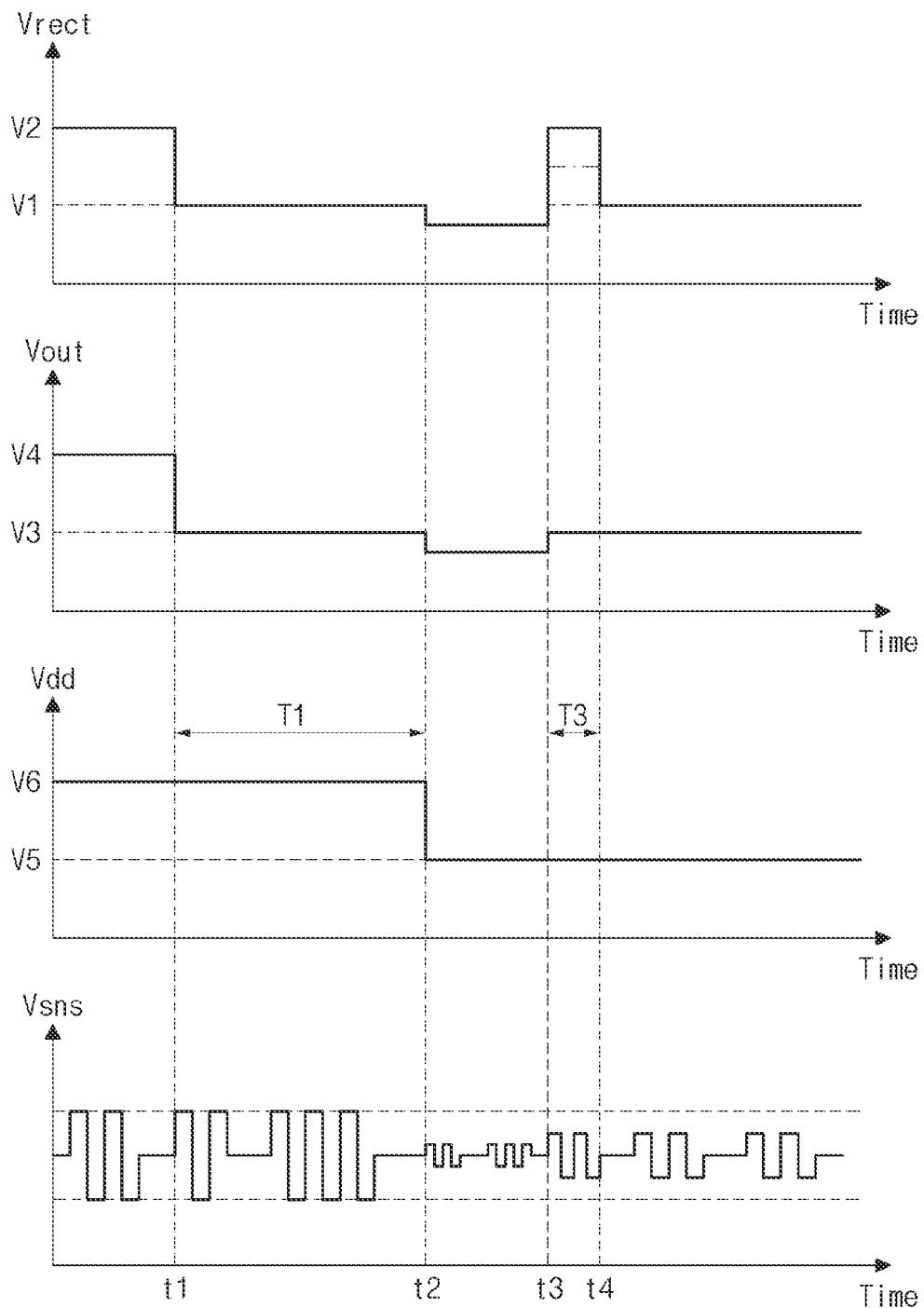
FIG. 9B is a timing diagram illustrating an example operation of a wireless charging system including a communication error prevention/reduction operation when a voltage drop event of a power reception device occurs according to various embodiments.

FIG. 9A is a flowchart illustrating an example operation of a power transmission device including a communication error prevention/reduction operation when a voltage drop event of a power reception device occurs according to various embodiments. FIG. 9B is a timing diagram illustrating an example operation of a wireless charging system including a communication error prevention/reduction operation when a voltage drop event of a power reception device occurs according to various embodiments.

Referring to FIGS. 2, 9A, and 9B, when not receiving a notification of occurrence of a voltage drop event (e.g., heating control or an operation of causing a decrease in a rectified voltage Vrect of a power reception device 202) from the power reception device 202, a power transmission device 201 may detect the voltage drop event of the power reception device 202 and may control an input voltage Vdd. Furthermore, the power transmission device 201 may recover a magnitude of the communication voltage Vsns decreased when the input voltage Vdd decreases, by means of a communication error prevention/reduction operation. When the input voltage Vdd decreases (e.g., decreases from V6 to V5) after a second time t2, a rectified voltage Vrect of the power reception device 202 may decrease to V2 or less.

When the rectified voltage Vrect of the power reception device 202 decreases to V1 or less, a regulated voltage Vout may decrease to V3 or less. When the rectified voltage Vrect of the power reception device 202 decreases to V1 or less, a magnitude (e.g., a modulation depth) of the communication voltage Vsns may decrease to a specific magnitude or less, and the power transmission device 201 may fail to demodulate the communication voltage Vsns. When the power transmission device 201 fail to demodulate the communication voltage Vsns (or fail to distinguish a packet included in the communication voltage Vsns), wireless charging may be ended.

According to an embodiment, in operation 910, the power transmission device 201 may receive charging power information of the power reception device 202. Furthermore, the power transmission device 201 may receive a power increase request or a power decrease request from the power reception device 202. The power transmission device 201 may increase or decrease a transmit power depending on the power increase request or the power decrease request.

According to various embodiments, the voltage drop event may occur at a first time t1 in the power reception device 202. According to the occurrence of the voltage drop event, the power reception device 202 may decrease the rectified voltage Vrect from V2 to V1. According to the occurrence of the voltage drop event, the power reception device 202 may decrease the regulated voltage Vout from V4 to V3. However, the power reception device 202 may fail to deliver information about the voltage drop event to the power transmission device 201.

According to various embodiments, the power transmission device 201 may receive charging power information including information about a charging power at the first time t1 or after the first time t1. According to various embodiments, at the first time t1 or after the first time t1, the power transmission device 201 may receive a power decrease request from the power reception device 202.

According to an embodiment, in operation 920, the power transmission device 201 may detect the occurrence of the voltage drop event of the power reception device 202. For example, the power transmission device 201 may detect the occurrence of the voltage drop event of the power reception device 202 based on at least one of the methods of FIG. 5A, FIG. 6, or FIG. 7. Thus, the power transmission device 201 may determine the occurrence of the voltage drop event based on the ratio of the charging power to the transmit power. The power transmission device 201 may determine the occurrence of the voltage drop event based on a duty ratio of the transmit power, which is kept during a specific time in a first reference time T1. The power transmission device 201 may determine the occurrence of the voltage drop event based on a frequency of the transmit power, which is kept during the specific time in the first reference time T1. As various embodiments, the power transmission device 201 may determine the occurrence of the voltage drop event based on at least one of the ratio of the charging power to the transmit power, a duty ratio of the transmit power, or a frequency of the transmit power.

According to various embodiments, when the voltage drop event is not detected ("No" in operation 920), the power transmission device 201 may continue monitoring charging power information.

According to an embodiment, when the voltage drop event is detected ("Yes" in operation 920), in operation 930, the power transmission device 201 may decrease the input voltage Vdd. For example, the power transmission device 201 may be configured to change the input voltage Vdd from V6 to V5 at a second time t2 (e.g., a time when the determination of the occurrence of the voltage drop event is determined). When the input voltage Vdd changes to V5, the rectified voltage Vrect of the power reception device 202 may decrease to V1 or less. When the rectified voltage Vrect of the power reception device 202 decreases to V1 or less, the regulated voltage Vout may decrease to V3 or less. When the rectified voltage Vrect of the power reception device 202 decreases to V1 or less, the communication voltage Vsns may decrease to a specific magnitude (e.g., a magnitude where the power transmission device 201 is unable to demodulate the communication voltage Vsns) or less. When the state where the communication voltage Vsns decreases continues, there may occur a problem in which wireless charging is ended.

According to an embodiment, in operation 940, the power transmission device 201 may set a duty ratio of the transmit power when detected to a specific value (e.g., a value greater than a duty ratio of a specific time (e.g., a second reference time T2) or a duty cycle of 50%) during a specific time (e.g., a third reference time T3). For example, the charging power may decrease due to the voltage drop event, the transmit power may also decrease in response to the charging power, and a duty ratio (e.g., a duty cycle of 20% or 30%) of the transmit power after the first time t1 may more decrease than before the first time t1 (e.g., a duty cycle of 50%) depending on the decrease in transmit power. When the input voltage Vdd decreases in the state where the duty ratio of the transmit power decreases, a magnitude (e.g., a modulation depth) of the communication voltage Vsns may decrease to a specific magnitude or less, and the power reception device 202 may fail to demodulate the communication voltage Vsns.

According to various embodiments, at a third time t3 after the second time t2 elapses (e.g., after the input voltage Vdd decreases), the power transmission device 201 may perform a communication error prevention/reduction operation during the third reference time T3. The communication error prevention/reduction operation may include increasing a duty ratio (e.g., a duty cycle of 20% or 30%) of the transmit power when detected to fix the duty ratio to a specific duty ratio (e.g., a duty cycle between the duty ratio when detected and 50% or a duty cycle of 50%) and maintain the duty ratio during a specific time (e.g., the third reference time T3). For example, the third reference time T3 may be shorter than the second reference time of FIG. 8B. The third reference time T3 may have a magnitude corresponding to one wavelength of the communication voltage Vsns.

In various embodiments, when the duty ratio of the transmit power increases to a specific duty ratio during the third reference time T3, as the transmit power increases, the rectified voltage Vrect of the power reception device 202 may increase, and the communication voltage Vsns may increase to a specific magnitude (e.g., a voltage magnitude where the power transmission device 201 is able to demodulate data). According to various embodiments, the rectified voltage Vrect of the power reception device 202 may be determined between V2 and V2 during the third reference time T3.

In various embodiments, as the input voltage Vdd varies during the third reference time T3, the rectified voltage Vrect of the power reception device 202 may increase and the communication voltage Vsns may increase to a specific magnitude (e.g., a magnitude capable of demodulating the communication voltage Vsns).

Figure 10A:
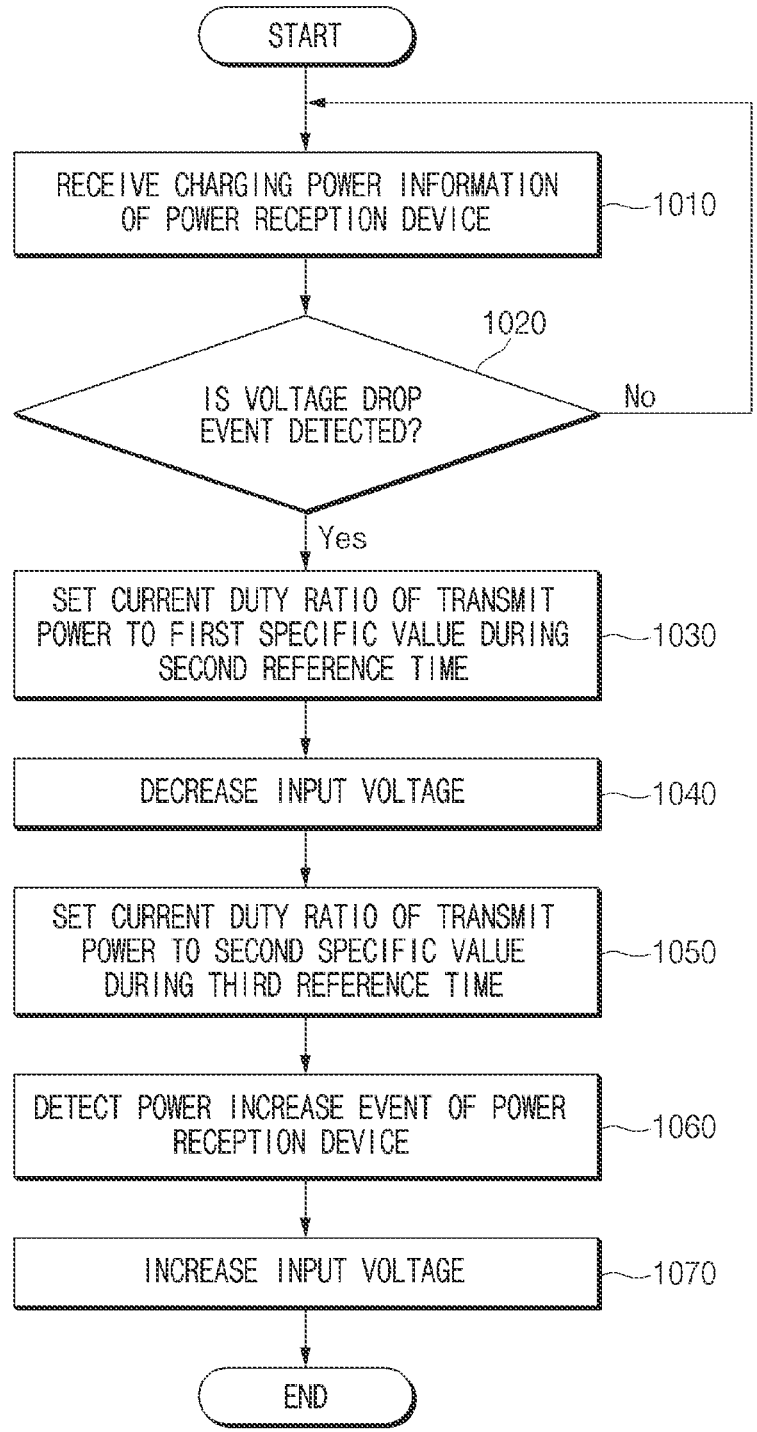
FIG. 10A is a flowchart illustrating an example operation of a power transmission device when a voltage drop event of a power reception device occurs according to various embodiments.
Figure 10B:
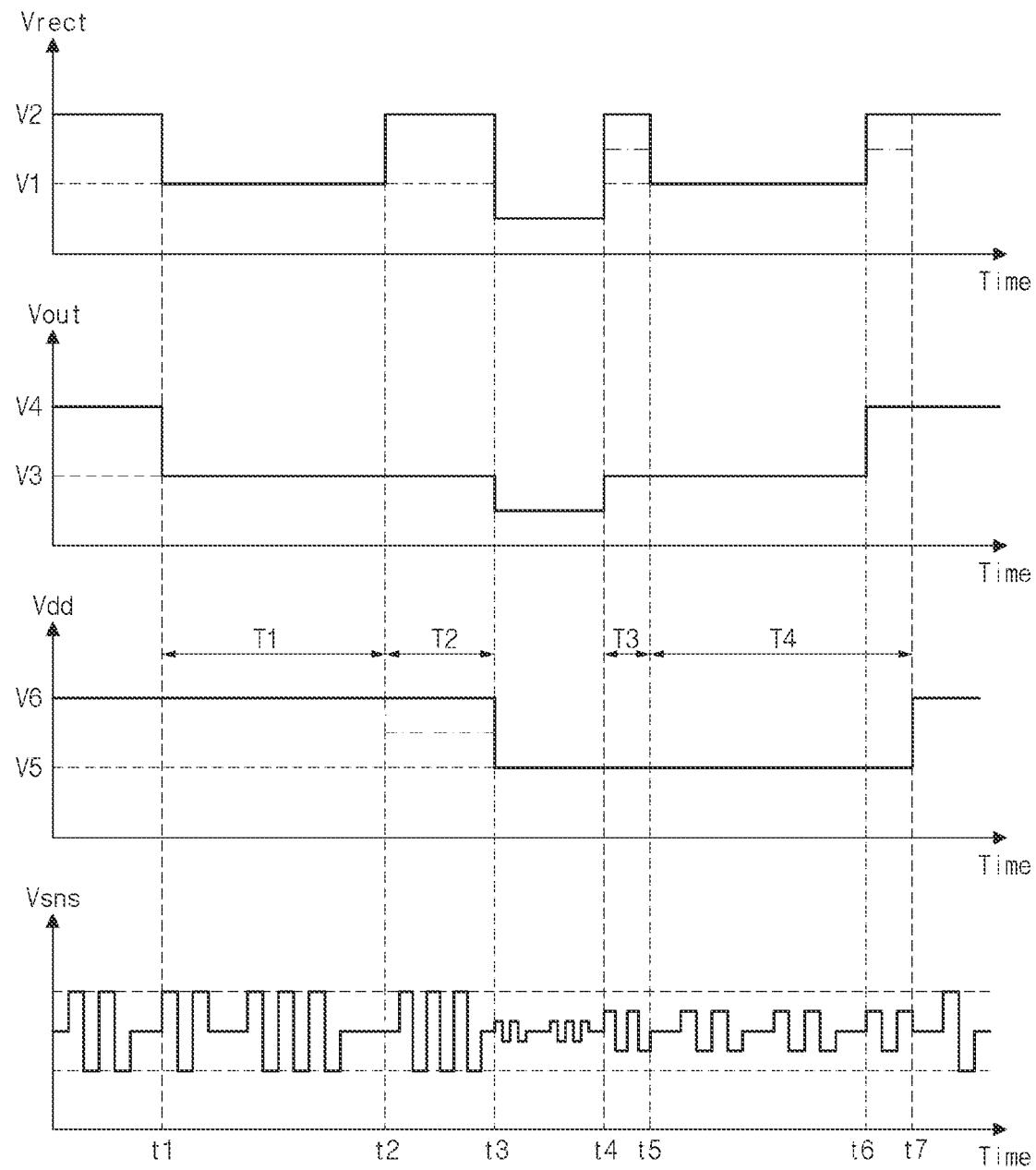
FIG. 10B is a timing diagram illustrating an example operation of a wireless charging system when a voltage drop event of a power reception device occurs according to various embodiments.

FIG. 10A is a flowchart illustrating an example operation of a power transmission device when a voltage drop event of a power reception device occurs according to various embodiments. FIG. 10B is a timing diagram illustrating an example operation of a wireless charging system when a voltage drop event of a power reception device occurs according to various embodiments.

Referring to FIGS. 2, 10A, and 10B, when not receiving a notification of occurrence of a voltage drop event (e.g., heating control or an operation of causing a decrease in a rectified voltage Vrect of a power reception device 202) from the power reception device 202, a power transmission device 201 may detect the voltage drop event of the power reception device 202 and may control an input voltage Vdd. Furthermore, the power transmission device 201 may apply a power ensuring operation of FIG. 8A and a communication error prevention/reduction operation of FIG. 9A, when the input voltage Vdd decreases.

According to an embodiment, in operation 1010, the power transmission device 201 may receive charging power information of the power reception device 202. Furthermore, the power transmission device 201 may receive a power increase request or a power decrease request from the power reception device 202. The power transmission device 201 may increase or decrease a transmit power depending on the power increase request or the power decrease request.

According to various embodiments, the voltage drop event may occur at a first time t1 in the power reception device 202. According to the occurrence of the voltage drop event, the power reception device 202 may decrease the rectified voltage Vrect from V2 to V1. According to the occurrence of the voltage drop event, the power reception device 202 may decrease the regulated voltage Vout from V4 to V3. However, the power reception device 202 may fail to deliver information about the voltage drop event to the power transmission device 201.

According to various embodiments, the power transmission device 201 may receive charging power information including information about a charging power at the first time t1 or after the first time t1. According to various embodiments, at the first time t1 or after the first time t1, the power transmission device 201 may receive a power decrease request from the power reception device 202.

According to an embodiment, in operation 1020, the power transmission device 201 may detect the occurrence of the voltage drop event of the power reception device 202. For example, the power transmission device 201 may detect the occurrence of the voltage drop event of the power reception device 202 based on at least one of the methods of FIG. 5A, FIG. 6, or FIG. 7. Thus, the power transmission device 201 may determine the occurrence of the voltage drop event based on the ratio of the charging power to the transmit power. The power transmission device 201 may determine the occurrence of the voltage drop event based on a duty ratio of the transmit power, which is kept during a specific time in a first reference time T1. The power transmission device 201 may determine the occurrence of the voltage drop event based on a frequency of the transmit power, which is kept during the specific time in the first reference time T1. As various embodiments, the power transmission device 201 may determine the occurrence of the voltage drop event based on at least one of the ratio of the charging power to the transmit power, a duty ratio of the transmit power, or a frequency of the transmit power.

According to various embodiments, when the voltage drop event is not detected ("No" in operation 1020), the power transmission device 201 may continue monitoring charging power information.

According to an embodiment, when the voltage drop event is detected ("Yes" in operation 1020), in operation 1030, the power transmission device 201 may set the duty ratio of the transmit power to a specific value (e.g., a value greater than a duty ratio when detected) during a specific time (e.g., a second reference time T2). For example, the transmit power of the power transmission device 201 may be reduced in response to a decrease in charging power due to the voltage drop event of the power reception device 202, and a duty ratio (e.g., a duty cycle of 20% or 30%) of the transmit power after a first time t1 may more decrease than before the first time t1 (e.g., a duty cycle of 50%) depending on the decrease in transmit power. At a second time t2 when the first reference time T1 elapses from the first time t1, the power transmission device 201 may determine to decrease the input voltage Vdd and may perform a power ensuring operation during the second reference time T2 before decreasing the input voltage Vdd. The power ensuring operation may include increasing a duty ratio (e.g., a duty cycle of 20% or 30%) of the transmit power when detected to fix the duty ratio to a first specific value (e.g., a duty cycle between the duty ratio when detected and 50%) and maintain the duty ratio during a specific time (e.g., the second reference time T2).

According to various embodiments, the power transmission device 201 may change the input voltage Vdd between V6 and V5 during the second reference time T2. The power transmission device 201 may adjust a duty ratio of the transmit power in response to the changed input voltage Vdd.

According to various embodiments, while changing the input voltage Vdd to V5 during the second reference time T2, the power transmission device 201 may adjust a duty ratio of the transmit power in response to the changed input voltage Vdd.

According to various embodiments, when the duty ratio of the transmit power is fixed to the first specific value during the second reference time T2, the rectified voltage Vrect of the power reception device 202 may more increase than V1 between the second time t2 and a third time t3, and a necessary charging power may be ensured after the input voltage Vdd decreases.

According to an embodiment, in operation 1040, the power transmission device 201 may decrease the input voltage Vdd. For example, the power transmission device 201 may be configured to change the input voltage Vdd, for example, from V6 to V5, at the third time t3. Although the power transmission device 201 decreases the input voltage Vdd at the third time t3, the regulated voltage Vout after the third time t3 may be kept as a constant value, by the power ensuring operation performed during the second reference time T2, in FIG. 10B unlike FIG. 5B.

According to an embodiment, in operation 1050, the power transmission device 201 may set a duty ratio of the transmit power when detected to a second specific value (e.g., a value greater than a duty ratio of the transmit power between the third time t3 and a fourth time t4 or a duty cycle of 50%) during a specific time (e.g., a third reference time T3). For example, the charging power may decrease due to the voltage drop event, the transmit power may also decrease in response to the charging power, and a duty ratio (e.g., a duty cycle of 20% or 30%) of the transmit power after the first time t1 may more decrease than before the first time t1 (e.g., a duty cycle of 50%) depending on the decrease in transmit power. The duty ratio of the transmit power may be fixed to the first specific value during the second reference time T2 and may decrease at the third time t3. When the input voltage Vdd decreases in the state where the duty ratio of the transmit power decreases, a magnitude (e.g., a modulation depth) of the communication voltage Vsns may decrease to a specific magnitude or less, and the power reception device 202 may fail to demodulate the communication voltage Vsns.

According to various embodiments, at a fourth time t4 after the third time t3 elapses (e.g., after the input voltage Vdd decreases), the power transmission device 201 may perform a communication error prevention/reduction operation during a third reference time T3. The communication error prevention/reduction operation may include increasing a duty ratio (e.g., a duty cycle of 30% or 40%) of the transmit power between the third time t3 and the fourth time t4 to fix the duty ratio to a second specific value (e.g., a duty cycle of 50% or a duty cycle between a duty ratio between the third time t3 and the fourth time t4 and 50%) and maintain the duty ratio during a specific time (e.g., the third reference time T3 and/or a fourth reference time T4). According to various embodiments, the input voltage Vdd of the power transmission device 201 after the fourth time t4 may vary for the communication error prevention/reduction operation.

In various embodiments, when the duty ratio of the transmit power increases to the second specific value during the third reference time T3, as the transmit power increases, the rectified voltage Vrect of the power reception device 202 may increase, and the communication voltage Vsns may increase to a specific magnitude (e.g., a voltage magnitude where the power transmission device 201 is able to demodulate the communication voltage Vsns). According to various embodiments, the rectified voltage Vrect of the power reception device 202 may be determined between V2 and V1 during the third reference time T3.

In various embodiments, as the input voltage Vdd varies during the third reference time T3, the rectified voltage Vrect of the power reception device 202 may increase and the communication voltage Vsns may increase to a specific magnitude (e.g., a magnitude where the power transmission device 201 is able to demodulate the communication voltage Vsns).

According to an embodiment, in operation 1060, the power transmission device 201 may detect a power increase event (e.g., release of heating control) of the power reception device 202. For example, at a sixth time t6 when the rectified voltage Vrect and the regulated voltage Vout of the power reception device 202 returns to specified voltages (e.g., V2 and V4) depending on the occurrence of the power increase event, the power transmission device 201 may receive charging power information and a power increase request from the power reception device 202. The power transmission device 201 may increase the transmit power depending on the power increase request. As the charging power increases, when the charging efficiency increases, the ratio of the charging power to the transmit power may decrease. Furthermore, when the transmit power increases, the duty ratio of the transmit power may increase and the frequency of the transmit power may decrease. As various embodiments, the power transmission device 201 may determine the occurrence of the power increase event based on at least one of the decrease in the ratio of the charging power to the transmit power, the increase in the duty ratio of the transmit power, or the decrease in the frequency of the transmit power.

According to an embodiment, in operation 1070, the power transmission device 201 may increase the input voltage Vdd to a specified voltage (e.g., V6 (about 10 V)) at a seventh time t7 after the sixth time t6 (e.g., a time when the power increase event is detected).

According to various embodiments, the power transmission device 201 may increase the input voltage Vdd to the specified voltage (e.g., V6 (about 10 V)) at the seventh time t7 after the fourth reference time T4 elapses from the fifth time t5 (e.g., a time when the communication error operation is applied).

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents.

What is claimed is:

1. A power transmission device configured to wirelessly supply power to an external electronic device, the power transmission device comprising:
   a coil configured to transmit a radio signal to the external electronic device based on a transmit power;
   a power generation circuit configured to supply the transmit power generated based on an input voltage to the coil; and
   a control circuit electrically connected with the coil and the power generation circuit,
   wherein the control circuit is configured to:
   receive information about a charging power from the external electronic device;
   determine whether a voltage drop event associated with decreasing an internal voltage of the external electronic device occurs based on a difference between the transmit power and the charging power; and
   control a magnitude of the input voltage based on the determination.

2. The power transmission device of claim 1, wherein the control circuit is configured to:
   determine the voltage drop event occurs, based on identifying that the ratio of the charging power to the transmit power is greater than or equal to a reference ratio.

3. The power transmission device of claim 1, wherein the control circuit is configured to:
   decrease the magnitude of the input voltage to a specified voltage, based on determining that the voltage drop event occurs.

4. The power transmission device of claim 3, wherein the control circuit is configured to:
   fix a duty ratio of the transmit power to a first duty ratio during a first period before decreasing the magnitude of the input voltage to the specified voltage, based on determining that the voltage drop event occurs.

5. The power transmission device of claim 3, wherein the control circuit is configured to:
   fix a duty ratio of the transmit power to a second duty ratio during a second period based on decreasing the magnitude of the input voltage to the specified voltage, based on determining that the voltage drop event occurs.

6. The power transmission device of claim 3, wherein the control circuit is configured to:
   set a duty ratio of the transmit power to a first duty ratio during a first period before decreasing the magnitude of the input voltage to the specified voltage and set the duty ratio of the transmit power to a second duty ratio during a second period based on decreasing the magnitude of the input voltage to the specified voltage, based on determining that the voltage drop event occurs.

7. The power transmission device of claim 6, wherein the control circuit is configured to:
   specify the second duty ratio to be the same as or higher than the first duty ratio.

8. The power transmission device of claim 1, wherein the control circuit is configured to:
   decrease the magnitude of the input voltage to a specified voltage and fix a duty ratio of the transmit power to a specified duty ratio during a specified period, based on determining that the voltage drop event occurs.

9. A power transmission device configured to wirelessly supply power to an external electronic device, the power transmission device comprising:
   a coil configured to transmit a radio signal to the external electronic device based on a transmit power;
   a power generation circuit configured to supply the transmit power generated based on an input voltage to the coil; and
   a control circuit electrically connected with the coil and the power generation circuit,
   wherein the control circuit is configured to:
   determine whether a voltage drop event associated with decreasing an internal voltage of the external electronic device occurs based on a transmit power frequency determined by the transmit power; and
   control a magnitude of the input voltage based on the determination.

10. The power transmission device of claim 9, wherein the control circuit is configured to:
    determine the voltage drop event occurs, based on identifying that the transmit power frequency is greater than a reference frequency.

11. The power transmission device of claim 10, wherein the control circuit is configured to:
   decrease the magnitude of the input voltage to a specified voltage, based on determining that the voltage drop event occurs.

12. The power transmission device of claim 11, wherein the control circuit is configured to fix a duty ratio of the transmit power to a first duty ratio during a first period before the decreasing the magnitude of the input voltage to a specified voltage.

13. The power transmission device of claim 11, wherein the control circuit is configured to fix a duty ratio of the transmit power to a second duty ratio during a second period based on the decreasing the magnitude of the input voltage to a specified voltage.

14. The power transmission device of claim 9, wherein the control circuit is configured to:
   determine that the voltage drop event occurs, based on the transmit power frequency being a threshold frequency.

15. A power transmission device configured to wirelessly supply power to an external electronic device, the power transmission device comprising:
   a coil configured to transmit a radio signal to the external electronic device based on a transmit power;
   a power generation circuit configured to supply the transmit power generated based on an input voltage to the coil; and
   a control circuit electrically connected with the coil and the power generation circuit,
   wherein the control circuit is configured to:
   determine whether a voltage drop event associated with decreasing an internal voltage of the external electronic device occurs based on a transmit power duty ratio determined by the transmit power; and
   control a magnitude of the input voltage based on the determined result.

16. The power transmission device of claim 15, wherein the control circuit is configured to:
   determine that the voltage drop event occurs, based on identifying that the transmit power duty ratio is less than a reference duty ratio.

17. The power transmission device of claim 15, wherein the control circuit is configured to decrease the magnitude of the input voltage to a specified voltage based on the voltage drop event occurring.

18. The power transmission device of claim 17, wherein the control circuit is configured to fix the transmit power duty ratio to a first duty ratio during a first period before the decreasing the magnitude of the input voltage to the specified voltage.

19. The power transmission device of claim 18, wherein the control circuit is configured to fix the transmit power duty ratio to a second duty ratio during a second period based on the decreasing the magnitude of the input voltage to the specified voltage.

20. The power transmission device of claim 15, wherein the control circuit is configured to:
   decrease the magnitude of the input voltage to a first voltage, based on a state where the transmit power duty ratio being less than a reference duty ratio continues during a specified period; and
   increase the magnitude of the input voltage to a second voltage greater than the first voltage, based on detecting at least one of a decrease in the ratio of a charging power to the transmit power, an increase in the transmit power duty ratio, or a decrease in frequency of the transmit power.

* * * * *